United States Patent
Narita et al.

(10) Patent No.: US 6,617,569 B2
(45) Date of Patent: Sep. 9, 2003

(54) PROBE OPENING FORMING APPARATUS AND NEAR-FIELD OPTICAL MICROSCOPE USING THE SAME

(75) Inventors: Yoshihito Narita, Tokyo (JP); Tsutomu Inoue, Tokyo (JP); Susumu Teruyama, Tokyo (JP); Toshiharu Saiki, Kanagawa (JP); Shuji Mononobe, Kanagawa (JP); Motoichi Ohtsu, Kanagawa (JP)

(73) Assignees: Jasco Corporation, Tokyo (JP); Kanagawa Academy of Science and Technology, Kanagawa (JP); Japan Science and Technology Corporation, Saitama (JP)

(*) Notice: Subject to any disclaimer, the term of this patent is extended or adjusted under 35 U.S.C. 154(b) by 0 days.

(21) Appl. No.: 09/860,643

(22) Filed: May 21, 2001

(65) Prior Publication Data

US 2001/0048068 A1 Dec. 6, 2001

(30) Foreign Application Priority Data

May 29, 2000 (JP) ........................................ 2000-158560
Jun. 2, 2000 (JP) ........................................ 2000-166238

(51) Int. Cl.⁷ ................................................. H01J 5/16
(52) U.S. Cl. ........................ 250/216; 250/234; 250/306
(58) Field of Search ............................... 250/216, 234, 250/306–311, 201.3; 73/105

(56) References Cited

U.S. PATENT DOCUMENTS

| | | | |
|---|---|---|---|
| 4,684,206 A | * | 8/1987 | Bednorz et al. ............ 385/129 |
| 5,254,854 A | | 10/1993 | Betzig |
| 5,333,495 A | * | 8/1994 | Yamaguchi et al. ........ 250/306 |

FOREIGN PATENT DOCUMENTS

| | | |
|---|---|---|
| EP | 0 112 401 A1 | 7/1984 |
| EP | 0 112 402 A | 7/1984 |
| EP | 0 459 392 A | 12/1991 |
| EP | 0 846 932 A | 6/1998 |
| JP | 4005170 | 7/1984 |
| JP | 11-281658 | 10/1999 |

OTHER PUBLICATIONS

D.W. Pohl, W. Denk, and M. Lanz, "Optical Stethoscopy: Image Recording with Resolution $\lambda/20$", Applied Physics Letters, American Institute of Physics. New York, US, vol. 44, No. 7, Apr. 1, 1984, pp. 651–653, XP000601898.
W. Fann, "Simple Transmission Mode Near-Field Optical Microscope", Review of Scientific Instruments, American Institute of Physics. New York, US, vol. 66, No. 1, part 1, pp. 271–272, XP 000495463.

(List continued on next page.)

*Primary Examiner*—Que T. Le
*Assistant Examiner*—Thanh X. Luu
(74) *Attorney, Agent, or Firm*—Snider & Associates; Ronald R. Snider

(57) ABSTRACT

A probe opening forming apparatus 139 comprising: light detecting means 140 for detecting a quantity of a light transmitted from a tip portion of the probe through a light of the source 116, which is on contact with the tip portion of the probe; storage means 142 for previously storing information about relation of the quantity of the light transmitted from the tip portion of the probe and the size of the opening; calculating means 144 for obtaining the value of the light quantity for obtaining an opening having a desirable size based on the information stored in the storage means 142; and pressing control means 126 for controlling the press of the tip portion of the probe against the light detecting means through the pressing means 114 such that a light quantity detected by the light detecting means 140 is equal to the light quantity calculated from the calculating means 144.

12 Claims, 21 Drawing Sheets

OTHER PUBLICATIONS

Robert D. Grober, et al., "Design and implementation of a low temperature near-field scanning optical micropscope," *Rev. Sci. Instrum.*, Mar. 1994, pp. 626–631, vol. 65, No. 3, American Institute of Physics.

Hitoshi Shiku, et al., "Near–Field Scanning Optical Microscopy," *Analytical Chemistry News & Features*, Jan. 1, 1999, pp. 23–29.

A. Richter, et al., "Real–Space Transfer and Trapping of Carriers into Single GaAs Quantum Wires Studied by Near–Field Optical Spectroscopy," *The American Physical Society*, Sep. 15, 19997, pp. 2145–2148, vol. 79, No. 11.

H.F. Hess, "Near–Field Spectroscopy of the Quantum Constituents of a Luminescent System," *Science* Jun. 17, 1994, pp. 1740–1745, vol. 264.

Robert D. Grober, et al., "Design and Implementation of a Low–Temperature Near–Field Scanning Optical Microscope," *Rev. Sci. Instrum.*, Mar. 1994, pp. 626, 628 and 630, vol. 65, No. 3. Incomplete Reference.

Robert D. Grober, et al., "Optical Spectroscopy of a GaAs/AlGaAs Quantum Wire Structure Using Near–Field Scanning Optical Microscopy," *Appl. Phys. Lett.*, Mar. 1994, pp. 1421–1423, vol. 64, No. 11, The American Institute of Physics.

\* cited by examiner (A)

(B)

PROBE OPENING FORMING APPARATUS AND NEAR-FIELD OPTICAL MICROSCOPE USING THE SAME

This application claims the priorities of Japanese Patent Application No. 2000-158560 filed on May 29, 2000 and Japanese Patent Application No. 2000-166238 filed on Jun. 2, 2000, which are incorporated herein by reference.

FIELD OF THE INVENTION

The present invention relates to a probe opening forming apparatus and a near-field optical microscope using the probe opening forming apparatus, and more particularly to an improvement of a method of controlling the size of an opening of a probe.

BACKGROUND OF THE INVENTION

In general, a microscope can observe a very fine portion without destruction in a non-contact with a sample and can further analyze a component of an observation object as well as a shape and a structure thereof by connecting a spectrum analyzer or the like, and has been applied to various fields.

However, a general optical microscope cannot observe a smaller thing than a wavelength of a light and has a resolution thereof limited.

On the other hand, in an electron microscope, the resolution can be enhanced greatly but it is very hard to carry out an operation in the air or in a solution. Thus, a high resolution microscope such as the electron microscope has not been always satisfactory particularly in the field in which a biological sample is to be treated.

On the other hand, a near-field optical microscope based on a different principle from the general optical microscope or the electron microscope has recently been developed and an application thereof has been expected.

The near-field optical microscope serves to detect a so-called evanescent light.

More specifically, in FIG. 1, a near-field optical microscope 10 has a very small sample 12 to be measured which is put on a flat substrate 14. When an excited light 18 is incident from a light source 16 at such an angle that total reflection is carried out over the back face of the substrate 14, all propagated lights are reflected. However, a surface wave referred to as an evanescent light 20 is generated in the vicinity of the surfaces of the substrate 14 and the sample 12. The surface wave is locally present in a region at a distance within the wavelength of the light around the surface of an object.

A probe 22 having a sharp end is inserted in the field of the evanescent light 20 to scatter the evanescent light 20. A part of a scattered light 21 enters the probe 22 and is guided to a detector 24, and data processing is carried out through a computer 26. Consequently, a distance between the tip portion of the probe 22 and the sample 12 can be grasped.

Accordingly, a stage 30 is moved through the computer 26 and a stage controller 28 and a vertical distance between the tip portion of the probe 22 and the sample 12 is controlled such that the scattered light 21 has a constant intensity, and a surface of the sample 12 which is to be measured is scanned. Consequently, it is possible to accurately grasp the concavo-convex portions of the sample 12 in a non-contact with the sample 12.

In addition, the tip of the probe 22 is only present in the field of the evanescent light 20 and does not come in contact with the object itself to be measured. Therefore, it is possible to observe a thing having a smaller value than the wavelength of the light without destruction in a non-contact with the sample 12.

As shown in FIG. 2, the probe 22 includes a core 32 constituted by a dielectric having a light transmittance and a mask 34 constituted by a metal thin film bonded on the surface of the core 32 through evaporation or the like.

An opening 36 is formed in the tip portion of the mask 34 and a tip portion 32a of the core 32 is appeared from the opening 36.

As a method of forming the opening of the probe, for example, the tip of the core of an optical fiber is sharpened by a selective chemical etching method, a method of heating and stretching the tip or the like.

In vacuum, a metal is heated and evaporated, and is bonded as a thin film to the surface of the sharpened probe, thereby forming a mask of a metal thin film or the like.

Next, the mask of the tip portion is removed through etching method, focused ion beam (FIB) or the like, for example. Consequently, the opening 36 is formed.

The probe 22 thus formed is attached to a head 31 of the near-field optical microscope 10 to carry out the near-field optical measurement described above.

In order to enhance the resolution of the near-field optical microscope, it is necessary to form an opening having a desired size in the tip of the probe with high reproducibility.

However, the mechanical dimension of the opening can be controlled but an optical characteristic such as a light transmittance cannot be controlled during formation by using the opening forming method described above. Consequently, the optical characteristic such as the light transmittance of the opening to which importance should be attached for performance has not been considered.

For this reason, when the fabricated probe is actually attached to the near-field optical microscope to carry out the measurement, the measurement cannot be carried out well in some cases.

Consequently, it has been greatly desirable that a technique for forming an opening having a desired size in the tip of the probe with high reproducibility should be developed in consideration of the optical characteristic such as the light transmittance. However, there has not been a proper technique capable of solving the problem.

SUMMARY OF THE INVENTION

In consideration of the above-mentioned problems of the conventional art, it is an object of the present invention to provide a probe opening forming apparatus capable of easily forming an opening having a more desirable size and a near-field optical microscope using the probe opening forming apparatus.

For achieving the above-mentioned object, the probe opening forming apparatus in accordance with the present invention is a probe opening forming apparatus for opening a mask of a tip portion of a probe with a desirable size, comprising a core constituted by a material having a light transmittance and a mask formed on the core and constituted by a material having a ductility and a light shielding property; the probe opening forming apparatus comprising a light source, a light detecting means, a pressing means, a storage means, a calculating means, and a pressing control means.

Here, the light source causes a light to be incident in the probe.

The light detecting means detects a quantity of a light transmitted from the tip portion of the probe through a light of the light source, which is on contact with the tip portion of the probe.

The pressing means presses the tip portion of the probe against the light detecting means in a direction of an optical axis.

The storage means previously stores information about relation of the quantity of the light transmitted from the tip portion of the probe and the size of the opening.

The calculating means obtains the value of the light quantity for obtaining an opening having a desirable size based on the information about the relation of the quantity of the light transmitted from the tip portion of the probe and the size of the opening which is stored in the storage means.

The pressing control means controls the press of the tip portion of the probe against the light detecting means in the direction of the optical axis through the pressing means such that a value of a light quantity detected by the light detecting means is equal to the value of the light quantity calculated from the calculating means.

The core constituted by a material having a light transmittance is formed of an optical fiber material such as quartz, a semiconductor, $CaF_2$, chalcogenide or the like.

Moreover, the mask constituted by a material having a ductility and a light shielding property is formed of a metal thin film to be used for a mirror, for example, gold, aluminum, silver, chromium or titanium which is formed on the core through evaporation or the like.

Furthermore, the mask formed in the tip portion of the probe is opened in the following manner. The mask formed in the tip portion of the probe has a ductility. Therefore, when the tip portion of the probe and the light detecting means are pressed in a direction of an optical axis, the mask is gradually stretched thinly so that an opening is formed. The tip portion of the core is appeared from the opening of the mask.

Moreover, the light quantity value of the light transmitted from the tip portion of the probe is zero when the opening is not formed on the mask. When the opening is formed in the mask, the light quantity value is increased in proportion to the size of the opening.

In the probe opening forming apparatus according to the present invention, a feeding means presses the tip portion of the probe and the light detecting means in the direction of the optical axis is suitably used for the pressing means such that the mask of the tip portion of the probe is gradually stretched thinly and opened without a breakage.

In the probe opening forming apparatus according to the present invention, moreover, it is also suitable that a photodiode excellent in the responsiveness of an output value for a light receiving quantity should be used for the light detecting means.

Here, the photodiode receives a light transmitted from the tip portion of the probe through a light receiving portion and outputs a current value proportional to the quantity of the received light.

Also, for achieving the above-mentioned object, the near-field optical microscope in accordance with the present invention comprising the probe opening forming apparatus in accordance with the present invention, a field of an evanescent light on a surface to be measured in a sample is scattered through a tip portion of a probe having an opening formed thereon by the opening forming apparatus, the scattered light is collected through the opening or the evanescent light leaking out of the opening is irradiated on the surface to be measured, and the scattered light or a reflected light is collected through the opening, thereby obtains information about the surface to be measured in the sample.

Preferably, in the present invention, a feeding means controls a distance between the tip portion of the probe and the surface to be measured in the sample in a direction of an optical axis is used for the pressing means.

Preferably, in the present invention, the near-field optical microscope comprises an opening diameter checking mechanism is an opening diameter checking mechanism for checking a size of an opening in a tip portion of a probe having the opening formed thereon, the opening diameter checking mechanism includes a light source, a light detecting means, a pressing means, a storage means, and a comparing means.

Here, the light source causes a light to be incident in the probe.

The light detecting means detects a quantity of a light transmitted from the tip portion of the probe through a light of the light source, which is on contact with the tip portion of the probe.

The pressing means presses the tip portion of the probe against the light detecting means in a direction of an optical axis.

The storage means previously stores information about relation of the quantity of the light transmitted from the tip portion of the probe and the size of the opening.

The comparing means applies a value of a light quantity detected by the light detecting means to the information about relation of the quantity of the light transmitted from the tip portion of the probe and the size of the opening which is stored in the storage means, thereby obtains the size of the opening in the tip portion of the probe.

Preferably, in the present invention, the near-field optical microscope comprises an opening diameter regulating mechanism for changing a size of an opening in a tip portion of a probe having the opening formed thereon, the opening diameter regulating mechanism includes a light source, a light detecting means, a pressing means, a storage means, a setting means, a calculating means, and a pressing control means.

Here, the light source causes a light to be incident on the probe.

The light detecting means detects a quantity of a light transmitted from the tip portion of the probe through a light of the light source, which is on contact with the tip portion of the probe.

The pressing means presses the tip portion of the probe against the light detecting means in a direction of an optical axis.

The storage means previously stores information about relation of the quantity of the light transmitted from the tip portion of the probe and the size of the opening.

The setting means sets a desirable size of the opening in the tip portion of the probe.

The calculating means obtains the value of the light quantity for obtaining an opening having a size set by the setting means based on the information about the relation of the quantity of the light transmitted from the tip portion of the probe and the size of the opening which is stored in the storage means.

The pressing control means controls the press of the tip portion of the probe against the light detecting means in the direction of the optical axis through the pressing means such that a value of a light quantity detected by the light detecting means is equal to the value of the light quantity calculated from the calculating means.

As described above, according to the probe opening forming apparatus according to the present invention and the near-field optical microscope using the probe opening forming apparatus, pressing control means for controlling the press of a tip portion of a probe with light detecting means in a direction of an optical axis through pressing means such that a value of a light quantity detected by the light detecting means for detecting a quantity of a light transmitted from the tip portion of the probe is equal to a value of a light quantity for obtaining an opening having a desirable size. Therefore, it is possible to easily form an opening having a desirable size in the tip portion of the probe.

According to the near-field optical microscope in accordance with the present invention, moreover, an opening diameter checking mechanism for checking the size of the opening in the probe having the opening formed thereon is provided. Consequently, the size of the opening of the probe can be checked easily.

According to the near-field optical microscope in accordance with the present invention, furthermore, an opening diameter regulating mechanism for changing the size of the opening in the probe having the opening formed thereon is provided. Consequently, the size of the opening of the probe can be changed easily.

DETAILED DESCRIPTION OF THE PREFERRED EMBODIMENT

A preferred embodiment of the present invention will be described below with reference to the drawings.

Figure 1:
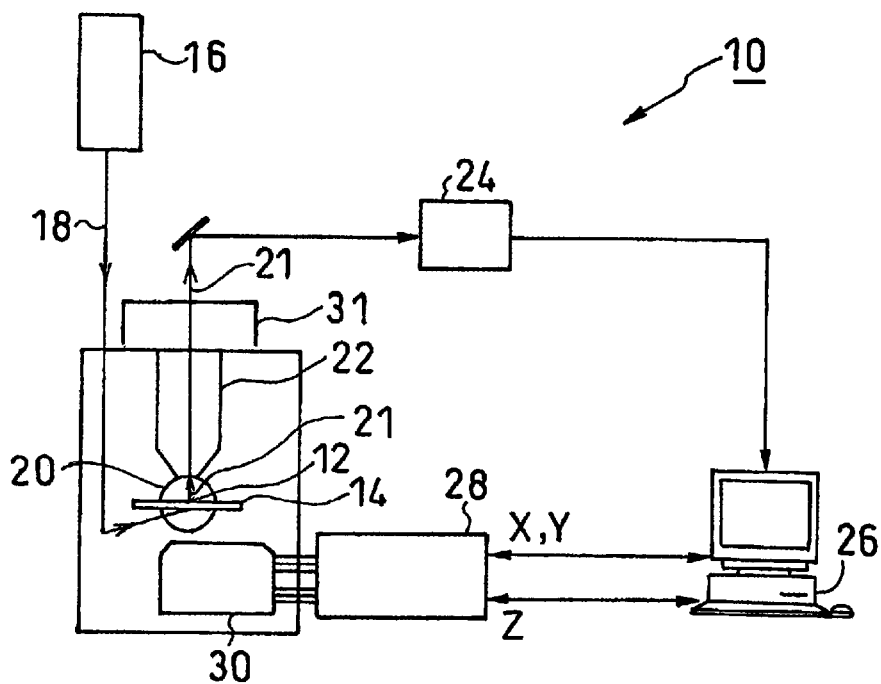
FIG. 1 is a view illustrating the schematic structure of a general near-field optical microscope.
Figure 2:
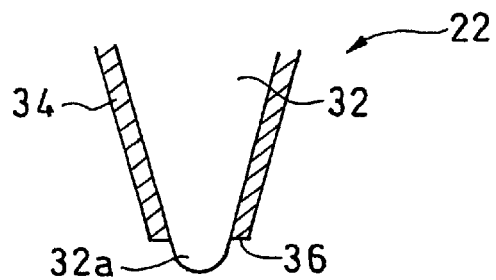
FIG. 2 is a view illustrating a probe.
Figure 3:
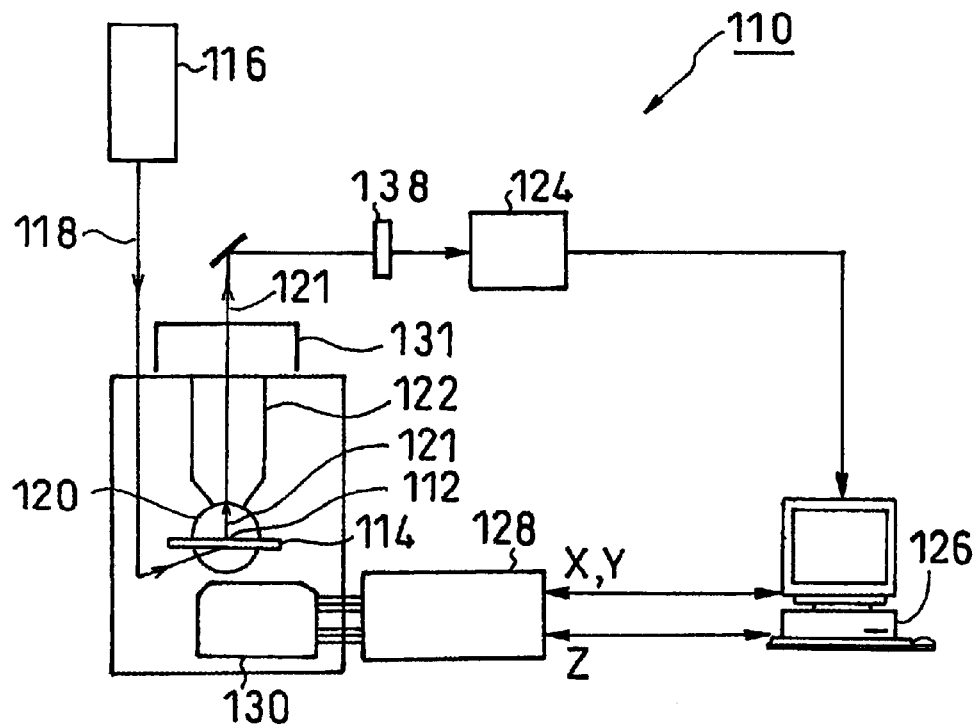
FIG. 3 is a view illustrating the schematic structure of a near-field optical microscope according to an embodiment of the present invention.

FIG. 3 shows the schematic structure of a near-field optical microscope according to an embodiment of the present invention. Portions corresponding to those in FIG. 1 have the reference numeral 100 added thereto and description will be omitted.

In the near-field optical microscope shown in FIG. 3, a sample 112 is provided on a substrate 114 and an excited light 118 is incident on a surface to be measured in the sample 112 so that an evanescent light 120 is generated on the surface to be measured in the sample 112.

When the tip portion of a probe 122 is inserted into the field of the evanescent light 120, the field of the evanescent light 120 is scattered by the tip portion of the fiber probe 122. Apart of the scattered light 121 enters the probe 122 through an opening and is split into a Rayleigh light, a fluorescence and a photoluminescence light through a spectroscope 138 which are then detected by a detector 124. Then, a data processing is carried out through a computer 126 so that a distance between the tip of the probe and the surface to be measured can be grasped through the Rayleigh light.

Accordingly, when the surface to be measured in the sample 112 is scanned while controlling a vertical distance between the tip portion of the probe 122 and the surface to be measured in the sample 112 such that the intensity of the Rayleigh light detected by the detector 124 becomes constant through a stage controller 128 and an XYZ stage 130, it is possible to accurately grasp the concavo-convex portions of the sample 112 in a non-contact with the sample 112. In addition, it is possible to simultaneously obtain component information on each measuring point of the surface to be measured in the sample 112 through the spectrum.

While the probe 122 is usually attached to a head of the near-field optical microscope 131, it is an article for consumption. Therefore, it is necessary to remove the probe 122 from the head 131 to be exchanged.

However, the quality of the opening influences the resolution of the near-field optical microscope or the like.

For example, when the probe such as an article on the market which has already been fabricated is exchanged and is attached to the head of the near-field optical microscope to carry out a measurement, the measurement cannot be carried out with a satisfactory brightness and the same precision in some cases.

The details of the cause have not been clear. According to the present inventors, however, even if the mechanical dimension of the probe opening has high precision, the light transmission efficiency of the opening is sometimes varied if the probe is used for an actual measurement. A reason is that the light transmission efficiency of the opening is changed if the probe is exchanged.

Moreover, the stage has a slight inclination depending on individual microscopes in many cases. In the probe of a manufactured article, a stage surface is not parallel with a probe opening surface but is shifted therefrom in some cases. Consequently, the evanescent light cannot be uniformly irradiated on the surface to be measured in the sample from the probe opening or a light scattered from the field of the evanescent light cannot be uniformly collected from the surface to be measured in the sample.

The present invention has a first feature that a near-field optical microscope comprises a probe opening forming apparatus capable of forming an opening having a desirable size in the tip portion of a probe in which the opening is not formed.

Figure 4:
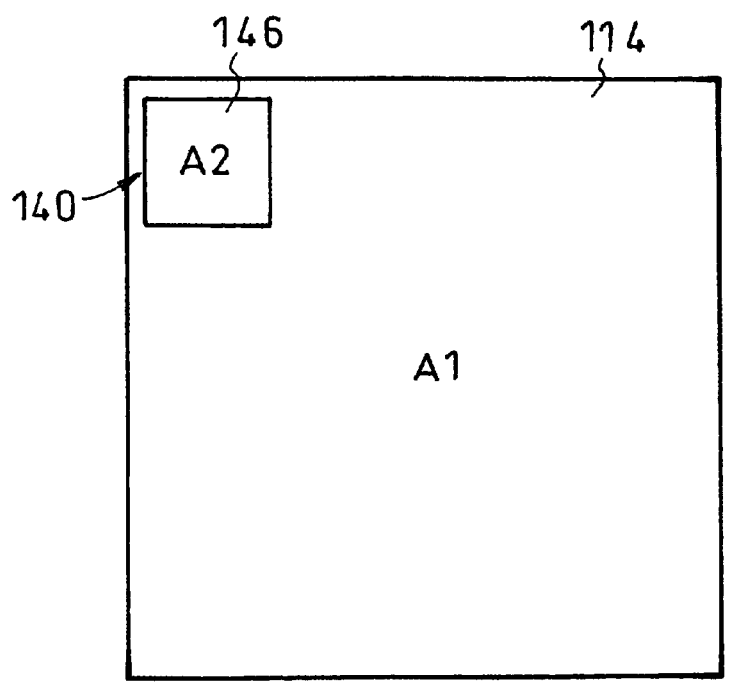
FIG. 4 is a view illustrating a place in the near-field optical microscope shown in FIG. 3 where a probe opening forming apparatus is to be provided.
Figure 5:
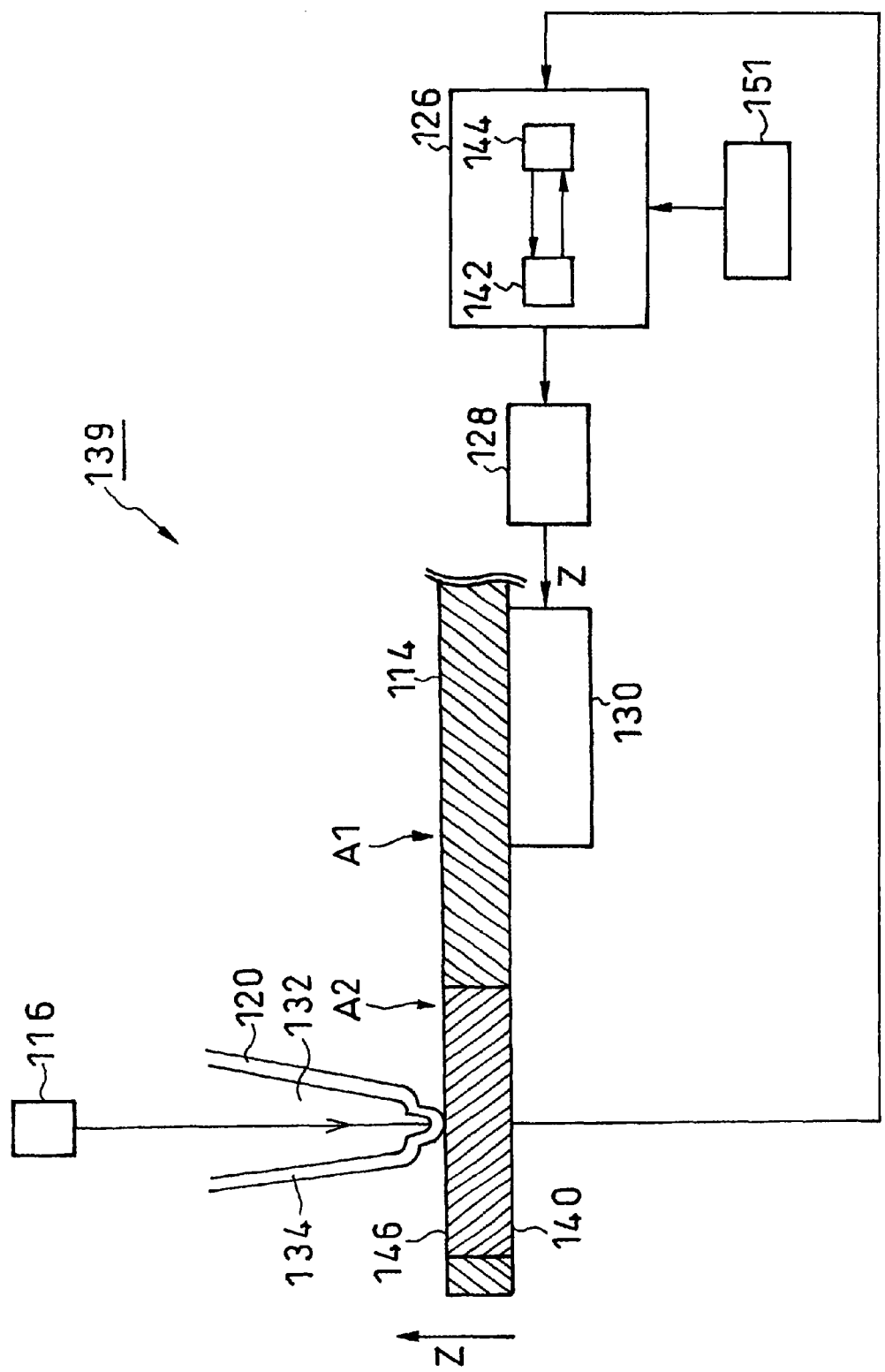
FIG. 5 is a view illustrating the schematic structure of the probe opening forming apparatus of the near-field optical microscope shown in FIG. 3, FIGS. 6A, 6B and 6C are views illustrating the action of the probe opening forming apparatus shown in FIG. 5.

In the present embodiment, therefore, an opening forming apparatus 139 shown in enlarged views of FIGS. 4 to 5 is provided.

As shown in FIG. 4, the substrate 114 of the XYZ stage 130 to be actually used for a near-field optical measurement is divided into an area A1 for carrying out a usual near-field optical measurement and an area A2 for opening formation or the like.

The area A2 is provided with a PIN photodiode (light detecting means) 140 of the probe opening forming apparatus 139 such that a light receiving surface 146 thereof is on the level with the surface of the substrate 114.

Moreover, the probe opening forming apparatus 139 comprises a light source 116 shown in FIG. 5, the XYZ stage (pressing means) 130, an HDD (storage means) 142 of the computer 126, and a CPU (calculating means, pressing control means) 144 of the computer 126. Moreover, one of ends of the probe in which an opening is not formed is fixed to a head of the near-field optical microscope.

The light source 116 to be used in the near-field optical microscope is also used as a light source for the probe opening forming apparatus 139.

The excited light (light) 118 is incident in the probe 122 from the light source 116.

Moreover, the PIN photodiode (light detecting means) 140 has an excellent characteristic that the quantity of the transmitted light can be measured efficiently. During the formation of the opening, the PIN photodiode 140 comes in contact with the tip portion of the probe 122 to detect the quantity of the light transmitted from the tip portion of the excited light 118.

Furthermore, a mechanism for driving the XYZ stage 130 to be used in the near-field optical microscope in a Z-axis direction is also used as the pressing means of the opening forming apparatus 139.

When the light receiving surface 146 of the photodiode 140 is gradually pressed against the tip portion of the probe through the XYZ stage 130, the mask 134 of the tip portion of the probe is gradually stretched thinly so that the core 132 is appeared from the mask opening. Thus, the opening is formed.

The HDD 142 of the computer 126 which is used in the near-field optical microscope is also used as the storage means of the opening forming apparatus.

The HDD 142 prestores information about relation of the quantity of the light transmitted from the tip portion of the probe 122 and the size of the opening.

The CPU 144 of the computer 126 which is used in the near-field optical microscope is also used as the calculating means of the opening forming apparatus.

The CPU 144 calculates the value of the light quantity for obtaining an opening having a desirable size from the information about the relation of the quantity of the light transmitted from the tip portion of the probe 122 and the size of the opening which is stored in the HDD 142.

The CPU 144 of the computer 126 which is used in the near-field optical microscope is also used as the pressing control means of the opening forming apparatus.

The CPU 144 controls the pressing of the photodiode against the tip portion of the probe in a direction of an optical axis through the XYZ stage 130 such that the value of the light quantity detected by the photodiode 140 is equal to a value of a light quantity calculated by the CPU 144.

Figure 6:
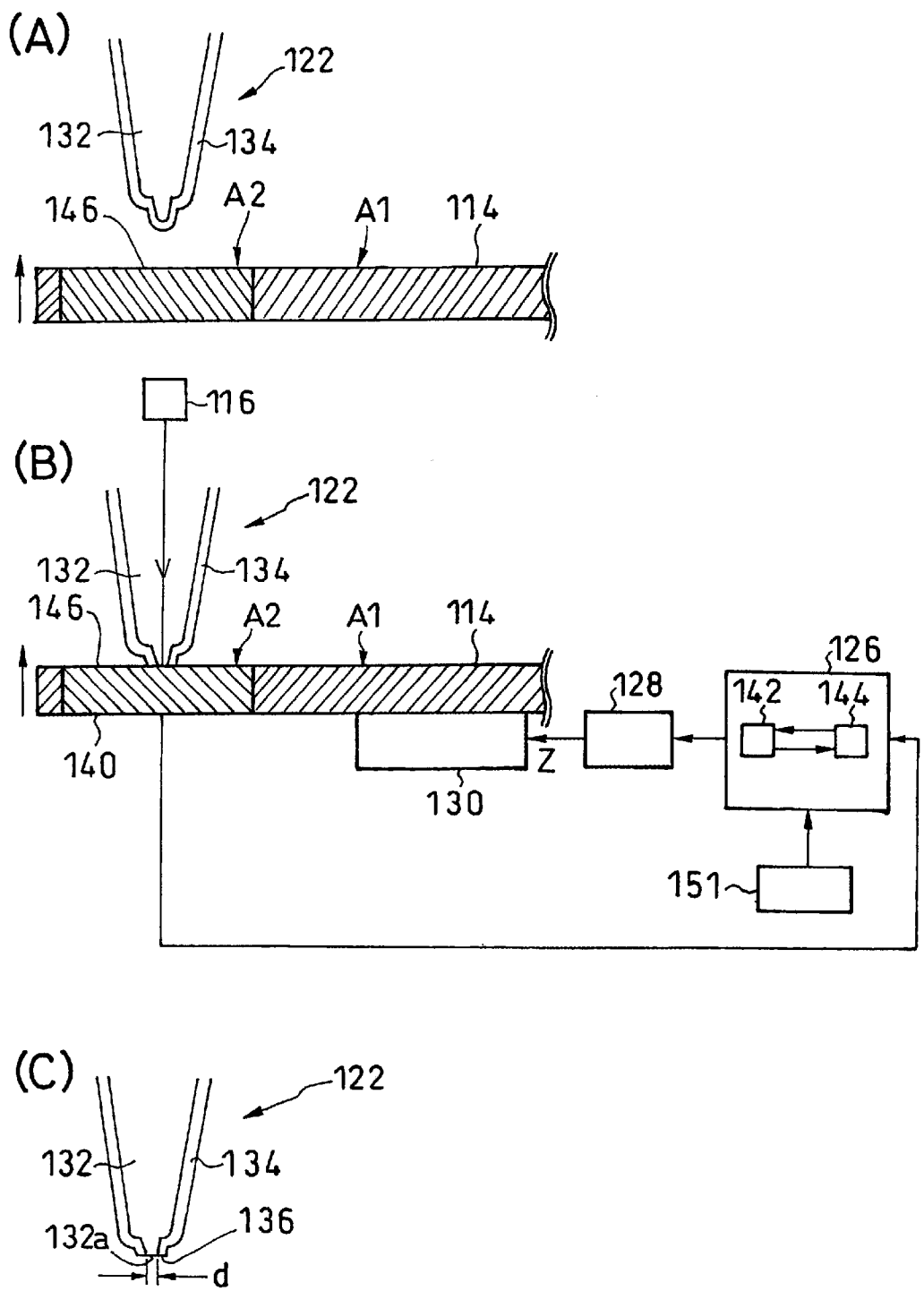

More specifically, the light receiving surface 146 of the photodiode 140 is caused to contact in the tip portion of the probe 122 in which the opening is not formed as shown in FIG. 6A.

As shown in FIG. 6B, the quantity of the light transmitted from the tip portion of the probe through the excited light 118 is detected and the value of the light quantity is monitored by the computer 126 to move the substrate 114 upward through the XYZ stage 130. Consequently, the light receiving surface 146 of the photodiode 140 is gradually pressed against the tip portion of the probe 122 upward in the drawing.

Through the gradual pressing, the mask 134 in the tip portion of the probe is gradually stretched thinly because it has a ductility. Consequently, an opening is gradually formed so that a tip portion 132a of a core 132 is appeared from the opening.

When the tip portion 132a of the core 132 is appeared, the value of the light quantity detected by the photodiode 140 which is zero is increased in proportion to an opening diameter. Consequently, the computer 126 gradually presses the photodiode 140 against the tip portion of the probe 122 until a value of a transmitted light quantity to obtain a desirable opening diameter is set through a mechanism for moving the XYZ stage 130 in the Z-axis direction.

Thus, the opening 136 having a desirable opening diameter d is formed on the mask 134 in the tip portion of the probe 122 as shown in FIG. 6C.

Therefore, the opening can be formed through the PIN photodiode 140 capable of efficiently measuring the quantity of a transmitted light while monitoring the value of a transmitted light quantity measured efficiently. Consequently, also in the case in which the probe is exchanged, it is possible to form an opening having an desired size with high reproducibility. For example, a round opening can be formed or the protrusion of a core portion can be reduced easily.

Moreover, the opening is formed in a state in which a sample stage surface to be actually used is provided on the level with the light receiving surface of the photodiode 140. Therefore, even if the stage surface is inclined, an opening surface parallel with the stage surface can be formed. In addition, the measurement is carried out in a state in which the probe having the opening thus formed thereon is attached to the head of the near-field optical microscope. Therefore, the measurement can be carried out accurately.

Furthermore, the function of each component of the opening forming apparatus is implemented by using each component of the near-field optical microscope. As compared with the case in which they are provided separately, therefore, a structure can be simplified and the size of the apparatus can be reduced.

Thus, the probe attached to the head of the near-field optical microscope can be used continuously until it is exchanged in the normal near-field optical measuring area A1 of the stage 130.

In some cases, moreover, the opening diameter is changed during the use of the opening formed as described above.

However, it has conventionally been supposed that the probe is removed from the microscope to carry out a check. However, simple checking means has not been present. Moreover, after the probe is attached, it is necessary to regulate an optical axis with an optical system for controlling the vibration and amplitude of the probe and the like, which is complicated.

The present invention has a second feature that the near-field optical microscope is provided with an opening diameter checking mechanism capable of checking the size of the opening in the tip portion of the probe which is formed by the probe opening forming apparatus, thereby carrying out the check with the probe attached to the head of the near-field optical microscope.

Figure 7:
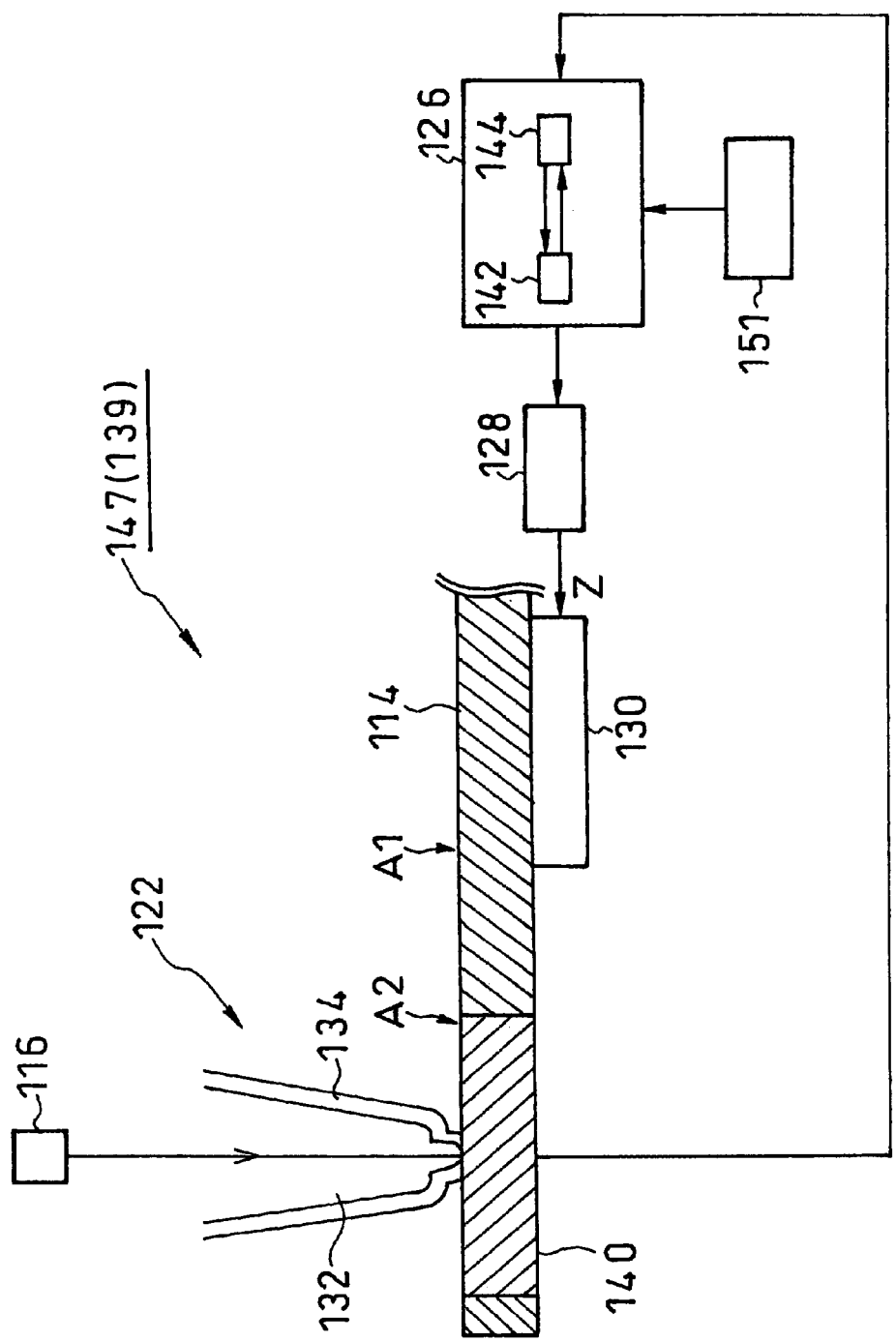
FIG. 7 is a view illustrating the schematic structure of an opening diameter checking mechanism of the near-field optical microscope shown in FIG. 3, FIGS. 8A and 8B are views illustrating the action of the opening diameter checking mechanism shown in FIG. 7.

In the present embodiment, therefore, an opening diameter checking mechanism 147 shown in the enlarged view of FIG. 7 is provided.

In FIG. 7, the opening diameter checking mechanism 147 includes the light source 116, the HDD (storage means) 142, the photodiode (light detecting means) 140 and the CPU (comparing means) 144.

The XYZ stage 130 causes the light receiving surface 146 of the photodiode 140 to contact in the tip portion of the probe.

The CPU (comparing means) 144 applies the value of the light quantity detected by the photodiode 140 to the information about the relation of the quantity of the light transmitted from the tip portion of the probe and the size of the opening which is stored in the HDD 142, thereby calculating the size of the opening formed in the tip portion of the probe.

Figure 8:
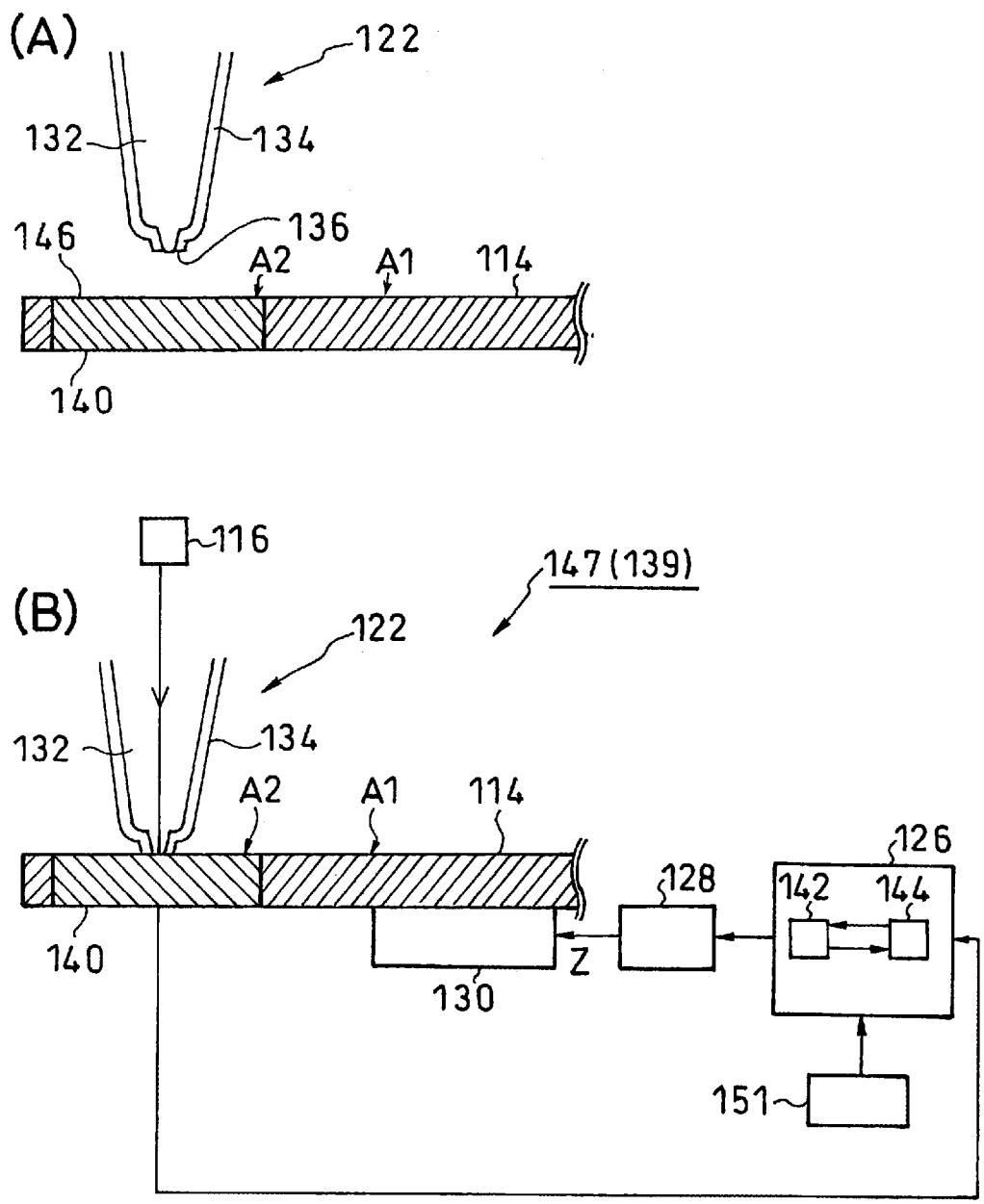

As a result, the probe 122 is positioned above the area A1 of the XYZ stage 130 during the normal near-field optical measurement, while the probe 122 having the opening 136 formed through the opening forming apparatus 139 is moved to the area A2 of the XYZ stage 130 as shown in FIG. 8A during the check of the opening diameter.

It is possible to easily detect that the opening having a predetermined diameter is formed or not by causing the light receiving surface of the photodiode to contact in the tip portion of the probe through the XYZ stage 130 with the probe 122 attached as shown in FIG. 8B.

In other words, the value of the light quantity of the light transmitted from the opening through the excited light has a proportional relationship with the size of the opening. Therefore, the quantity of the light transmitted from the tip portion of the probe is detected by the photodiode 140 with the light receiving surface 146 of the photodiode 140 contacting on the tip potion of the probe. The CPU 144 applies the value of the light quantity thus detected to the information about the relation of the quantity of the light transmitted from the tip portion of the probe and the size of the opening which is stored in the HDD 142, thereby calculating the size of the opening formed in the tip portion of the probe.

Furthermore, the function of each component of the opening diameter checking mechanism is implemented by using each component of the near-field optical microscope (opening forming apparatus). As compared with the case in which they are provided separately, therefore, the structure can be simplified and the size of the apparatus can be reduced.

When the opening diameter is sufficient after the checking, the probe is returned to the area A1 of the XYZ stage 130 to carry out a normal near-field optical measurement.

On the other hand, in some cases, the opening diameter of the opening formed as described above is changed or is to be changed after the formation.

However, conventionally, it is necessary to exchange the probe. After the probe is attached, it is necessary to regulate the optical axis with the optical system for controlling the vibration and amplitude of the probe, which is complicated.

The present invention has a third feature that the near-field optical microscope is provided with an opening diameter regulating mechanism capable of changing the size of the opening of the probe which is formed by the probe opening forming apparatus, thereby changing the size of the probe attached to the head of the near-field optical microscope.

Figure 9:
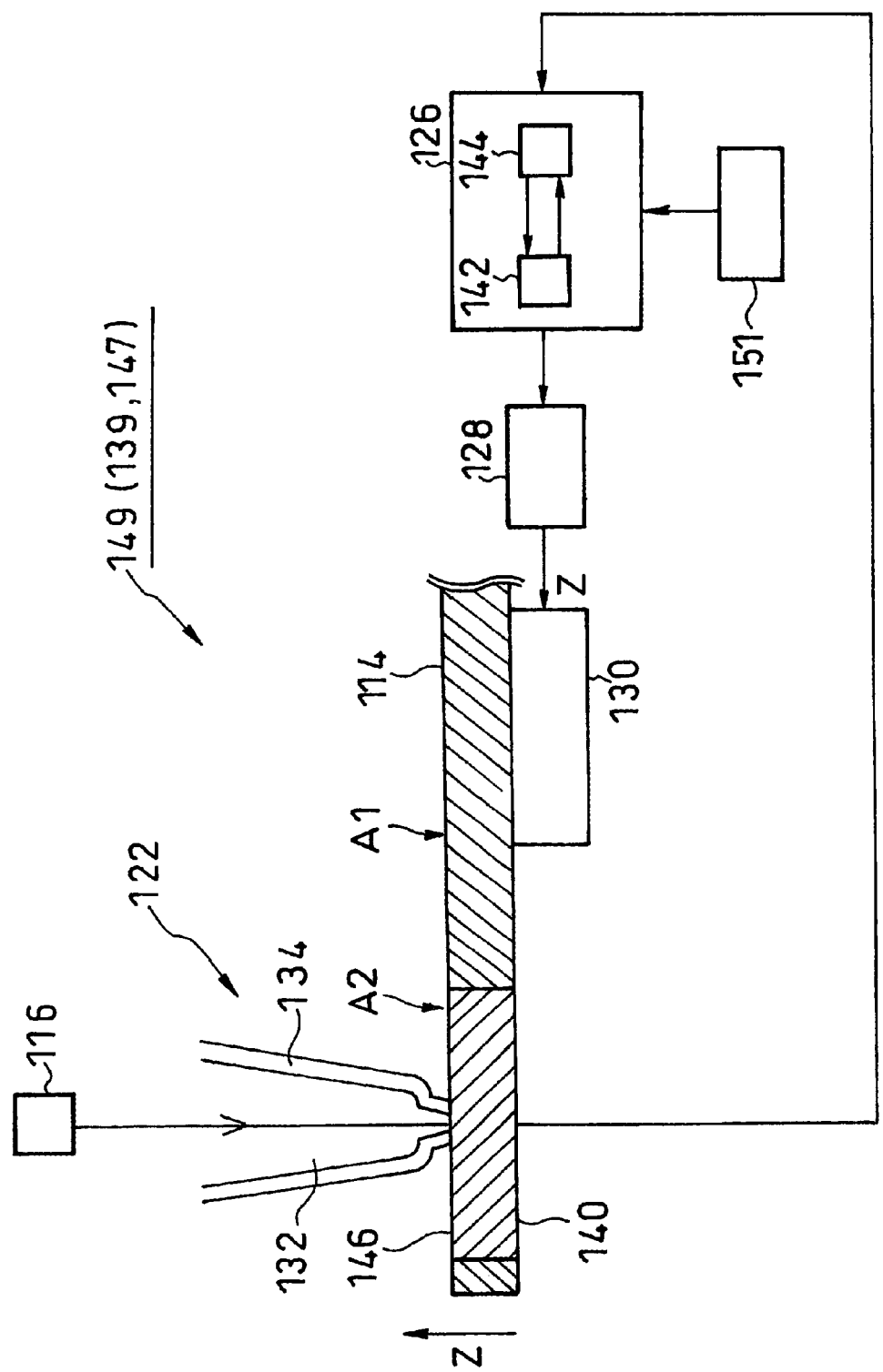
FIG. 9 is a view illustrating the schematic structure of an opening diameter regulating mechanism of the near-field optical microscope shown in FIG. 3, FIGS. 10A and 10B are views illustrating the action of the opening diameter regulating mechanism shown in FIG. 9, FIGS. 11A and 11B are views illustrating a spectroscope to be suitably used in the near-field optical microscope.

In the present embodiment, therefore, an opening diameter regulating mechanism 149 shown in the enlarged view of FIG. 9 is provided.

The opening diameter regulating mechanism 149 includes the light source 116, the photodiode (light detecting means) 140, the CPU (calculating means, press controlling means) 142, and an input device (setting means) 151.

The input device 151 can set the desirable size of the opening in the tip portion of the probe to the computer 126.

The CPU (comparing means) 144 applies the opening diameter set by the input device 151 to the information about the relation of the quantity of the light transmitted from the tip portion of the probe and the size of the opening which is stored in the HDD 142, thereby calculating the valve of the light transmitted from the tip portion of the probe in order to obtain the desirable opening diameter.

The CPU 144 controls the pressing of the light receiving surface 146 of the photodiode 140 against the tip portion of the probe through the movement (upward movement) of the XYZ stage 130 in the Z-axis direction such that the value of the transmitted light quantity which is detected by the photodiode 140 is equal to the value of a light quantity which is calculated by the CPU 142.

Figure 10:
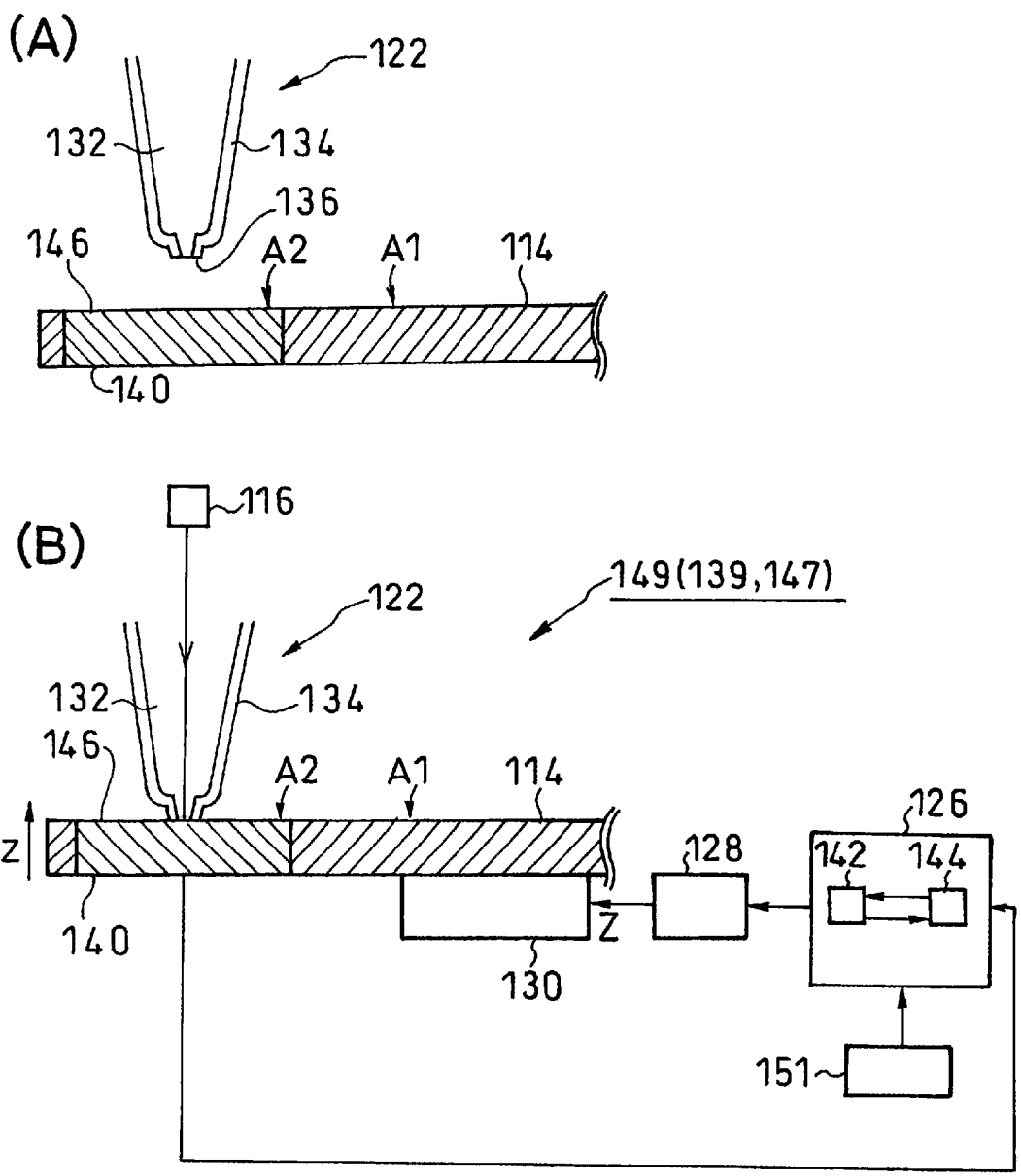

As a result, the probe is positioned above the area A1 of the XYZ stage during the normal near-field optical measurement, while the probe 122 having the opening 136 formed through the opening forming apparatus 139 is moved to the area A2 of the substrate 114 in the XYZ stage 130 as shown in FIG. 10A during the change.

As shown in FIG. 10B, the light receiving surface of the photodiode 140 is caused to contact in the tip portion of the probe, thereby inputting the desirable size of the opening through the input device 151.

Then, the CPU 144 calculates the value of the light quantity for obtaining the size of the opening input by the input device 151 through application to the information about a detected quantity which is stored in the HDD 142.

In a state in which the light receiving surface 146 of the photodiode 140 contacts in the tip portion of the probe, the CPU 144 controls the pressing of the light receiving surface of the photodiode against the tip portion of the probe through the movement in the Z-axis direction of XYZ stage 130 while detecting the quantity of the light transmitted from the tip portion of the probe through the photodiode 140 such that the value of the transmitted light quantity which is detected by the photodiode 140 is equal to the value of the light quantity which is calculated by the CPU 142. Thus, the change to an opening diameter d' of the probe opening can easily be carried out.

After the opening diameter is changed, the probe is returned to the area A1 of the XYZ stage to carry out the normal near-field optical measurement.

In the present embodiment, thus, it is possible to easily desirably change the size of the opening by pressing the light receiving surface of the photodiode against the tip portion of the probe 122 with the probe 122 attached.

Furthermore, the function of each component of the opening diameter regulating mechanism is implemented by using each component of the near-field optical microscope (the opening forming apparatus, the opening diameter checking mechanism). As compared with the case in which they are provided separately, therefore, the structure can be simplified and the size of the apparatus can be reduced.

As described above, the near-field optical microscope 110 according to the present embodiment comprises the opening forming apparatus 139 for forming an opening while actually monitoring the transmittance characteristics of the opening. Therefore, it is possible to form an opening having an intended size with high reproducibility.

In addition, the sample stage surface to be actually used is provided on the level with the light receiving surface of the photodiode 140 to form the opening. Therefore, it is possible to form an opening surface parallel with the stage surface.

The near-field optical measurement is used continuously until the probe is exchanged. Therefore, it is possible to accurately carry out the near-field optical measurement above the area A1.

In the present embodiment, moreover, the opening diameter checking mechanism 147 is provided. Therefore, it is possible to easily check the opening of the probe having the opening formed thereon through the movement of the probe to the area A2 on the level with the area A1 in the stage without removing the probe from the microscope.

In the present embodiment, furthermore, the opening diameter regulating mechanism 149 is provided. Therefore, it is possible to desirably change the size of the opening easily through the movement of the probe to the area A2 on the level with the area A1 without removing the probe from the microscope.

The near-field optical microscope according to the preset invention is not restricted to have the above-mentioned structure but various changes can be made without departing from the scope of the invention.

With the above-mentioned structure, for example, the probe opening forming apparatus according to the present invention is incorporated in the near-field optical microscope. The probe opening forming apparatus according to the present invention can also be used independently.

With the above-mentioned structure, moreover, the position in the Z-axis direction of the probe is fixed and the light detecting means is moved (upward) in the Z-axis direction is pressed against the tip portion of the probe. It is also preferable that the position in the Z-axis direction of the light detecting means should be fixed, the probe should be moved (downward) in the Z-axis direction through a mechanism for feeding a fine movement in the Z-axis direction or the like, thereby pressing the tip portion of the probe against the light detecting means.

Moreover, it is also preferable that the following mechanism should be added to the near-field optical microscope according to the purpose of use and the like.

<Spectral Mechanism 1>

Filter spectrum is a very excellent detecting method because information about concavo-convex portions of a surface to be measured in a sample and information about a component on each measuring point are obtained at the same time, for example. In general, there has been employed a method of repetitively inserting and removing a filter in and from an optical path, thereby selecting a wavelength.

However, a space is required for selecting a large number of wavelengths. Moreover, a mechanism for inserting and removing the filter is also complicated.

Figure 11:
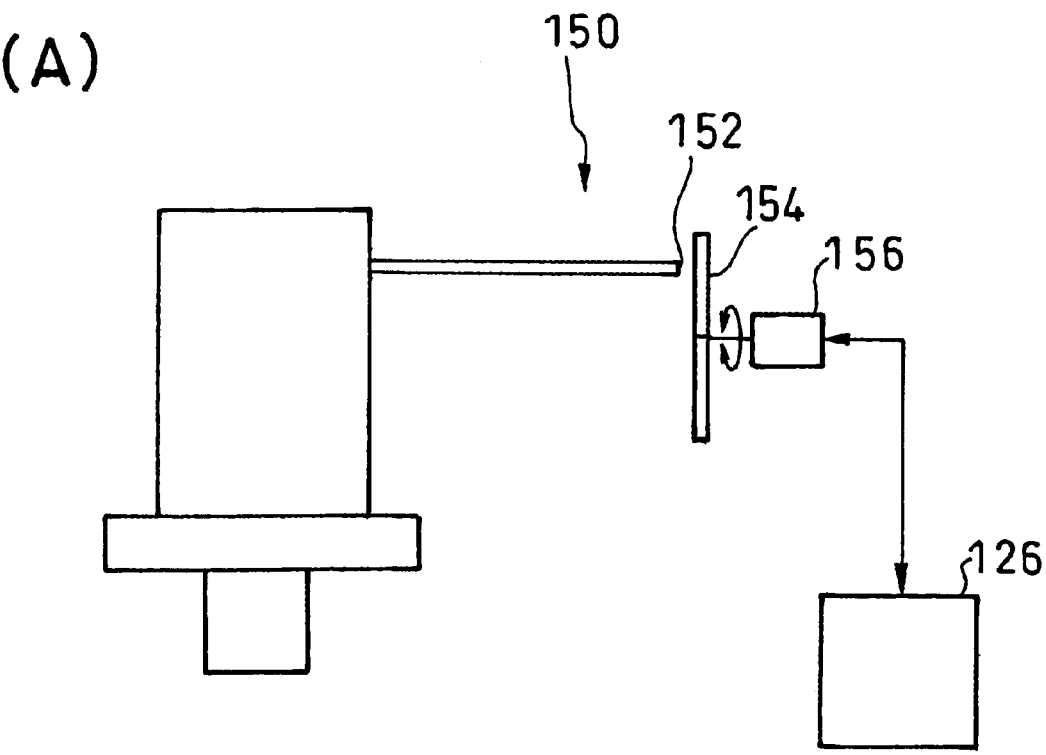
Figure 11:
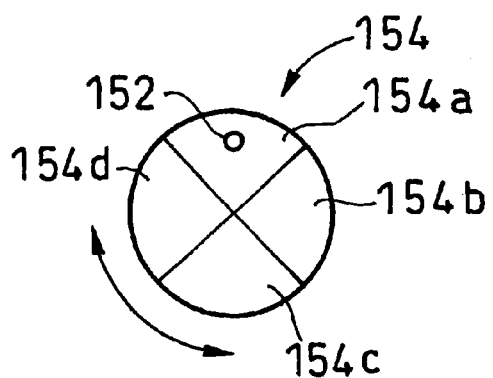

When the filter spectrum is to be carried out, it is preferable that a spectral mechanism 150 shown in an enlarged view of FIG. 11 should be provided in the latter stage of an optical fiber 152 for guiding the scattered light of a field of an evanescent light on the surface to be measured in the sample.

FIG. 11A is a side view showing a main part and FIG. 11B is a view showing the following filter seen in a direction of advance of a light.

In FIG. 11A, the spectroscope 150 comprises a disk-shaped filter 154 in which wavelength selecting portions 154a to 154d capable of selecting a plurality of different wavelengths are provided concentrically, driving means 156, and a computer (control means) 126.

The filter 154 selects an optical component having a desirable wavelength through the desired wavelength selecting portions 154a to 154d through the scattered light of the field of the evanescent light on the surface to be measured in the sample which is transmitted from the optical fiber 152.

The driving means 156 includes a stepping motor having high driving precision, a DC motor or the like, for example. The filter 154 is rotated to position the desirable wavelength selecting portion on an optical axis, thereby changing the selected wavelength.

The computer 126 controls the operation of the driving means 156 such that the wavelength selected by the filter 154 is a desirable wavelength.

As a result, it is possible to easily select a multi-wavelength by using one spectroscope 150 as shown in FIG. 11A.

With the above-mentioned structure, for example, there is used the disk-shaped filter 154 having the different wavelength selecting portions 154a to 154d provided concentrically. Instead, it is also preferable that a rotation type wavelength selecting filter for linearly changing a wavelength to be selected should be used. Consequently, it is possible to easily select a multi-wavelength through one disk-shaped filter 154 in the same manner.

<Spectral Mechanism 2>

In a near-field optical microscope, generally, a light signal from a sample can be acquired in various modes such as an illumination mode, a collection mode and the like, for example.

In order to simultaneously observe a plurality of mode signals, however, a plurality of spectroscopes and detectors should be prepared or a measurement should be repeated in each mode.

Figure 12:
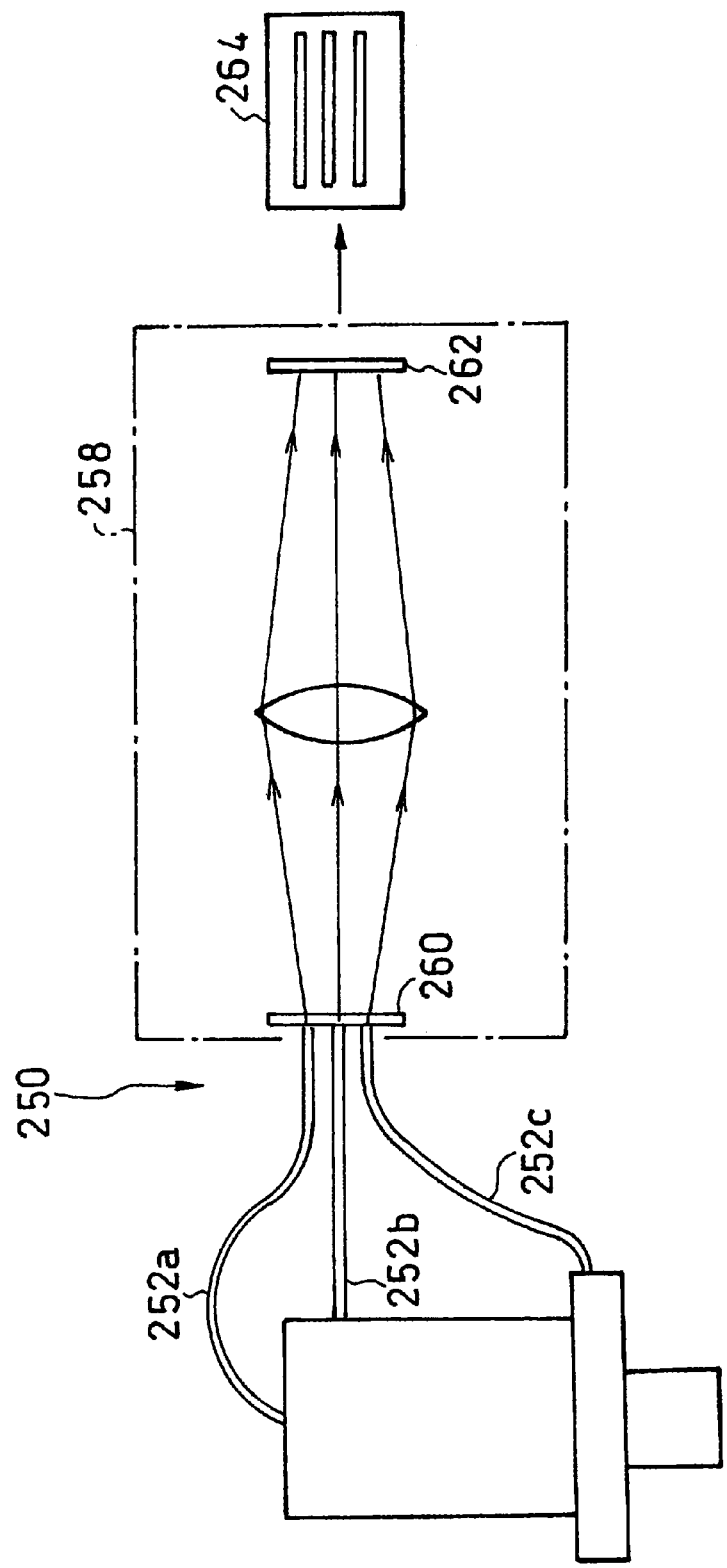
FIG. 12 is a view illustrating a variant of the spectroscope to be suitably used in the near-field optical microscope.

In order to simultaneously acquire various measuring modes, it is also preferable that the spectroscope 250 shown in an enlarged view of FIG. 12 should be provided in the latter stage of the optical fiber 252.

In FIG. 12, the spectral mechanism 250 comprises light collecting means 252*a* for acquiring a light signal from a sample in a collection mode, light collecting means 252*b* for acquiring a light signal from the sample in an illumination mode, light collecting means 252*c* for acquiring a light signal from the sample in a transmission mode, and a spectroscope 258, for example.

Each light collected by the light collecting means 252*a*, 252*b* and 252*c* is arranged in the vertical direction of a vertical slit 260 of the spectroscope 258 and is thus split at the same time. The light thus split is taken out to a vertical slit 262 on the emitting side and is simultaneously detected through a multi-channel detector 264.

As a result, thus one spectroscope 258 and one detector 264, it is possible to simultaneously detect a light signal and a spectrum of a sample which are collected in various measuring modes. Consequently, the structure can be more simplified as compared with the case in which they are provided, respectively. In addition, the light signal of the sample which is obtained in various measuring modes can be obtained at the same time. Therefore, the same sample can be measured at the same time. Consequently, the sample can be measure in more detail and the number of measurements can be decreased. Thus, an operation can be carried out easily.

<Simple Observing Mechanism 1>

In the case in which an optical fiber probe is used, it is generally necessary to adjust the positions of an optical fiber and an optical path for an excited light. The adjustment is carried out by setting the position of a light transmitted from the tip of the probe.

However, the intensity of the light transmitted from the tip of the probe is very low and is hard to regulate. Moreover, when a light other than a visible light is to be coupled, it cannot be observed with eyes. Therefore, it is necessary to use a camera for observing the tip of the probe. Furthermore, there is no method for directly confirming the smoothness of the end face of the optical fiber and the situation in which dust sticks. Therefore, optical adjustment is carried out with difficulty. Moreover, the diameter of the optical fiber is very small, several micrometers. Therefore, it is very hard to adjust the positions.

Figure 13:
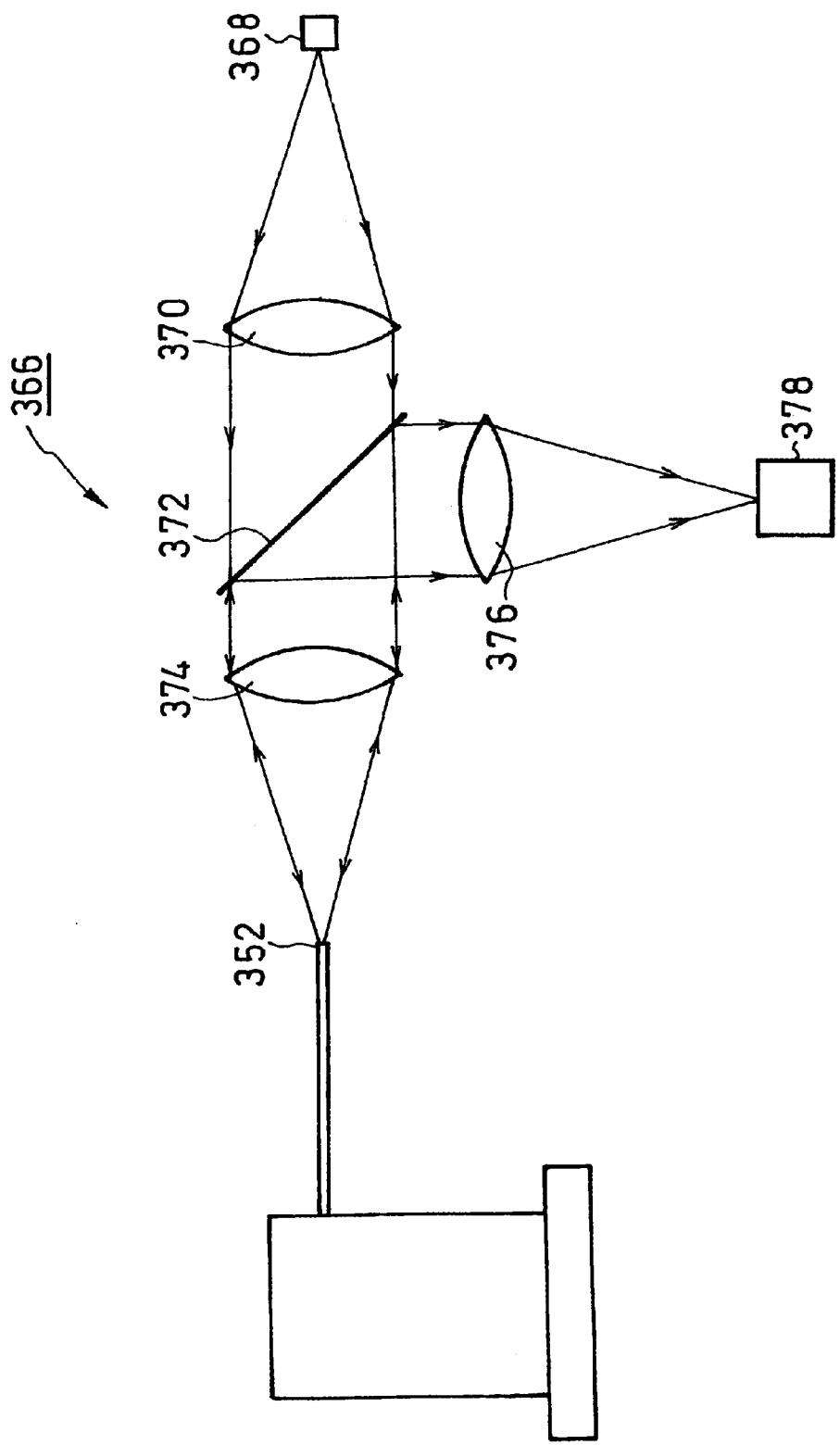
FIG. 13 is a view illustrating a state in which an end face of a fiber is observed through an observing mechanism to be suitably used in the near-field optical microscope.

In order to easily adjust the positions of the optical fiber and the optical path, it is preferable that an observing mechanism 366 for observing a coupled portion to the optical fiber in the end portion of the probe should be added as shown in the enlarged view of FIG. 13.

In FIG. 13, the observing mechanism 366 has such a structure that a light emitted from a light source 368 is changed to a parallel luminous flux through a convex lens 370, the light transmitted from the convex lens 370 is incident as a parallel luminous flux on a convex lens 374 through a beam splitter 372 and is converged on the convex lens 374, and the converged light is incident on an end portion of the probe 352. The light transmitted from the fiber end face 352 is collected through the convex lens 374 and is reflected by the beam splitter 372 downward in the drawing, and furthermore, is incident on a convex lens 376 in the latter stage and is collected into a monitor 378 through the convex lens 376. In the monitor 378, it is possible to observe a coupled portion to the optical fiber in the end portion of the probe.

As a result, the end portion of the optical fiber can be observed with eyes through a microscope. Therefore, it is possible to easily carry out the optical adjustment without depending on a wavelength.

Figure 14:
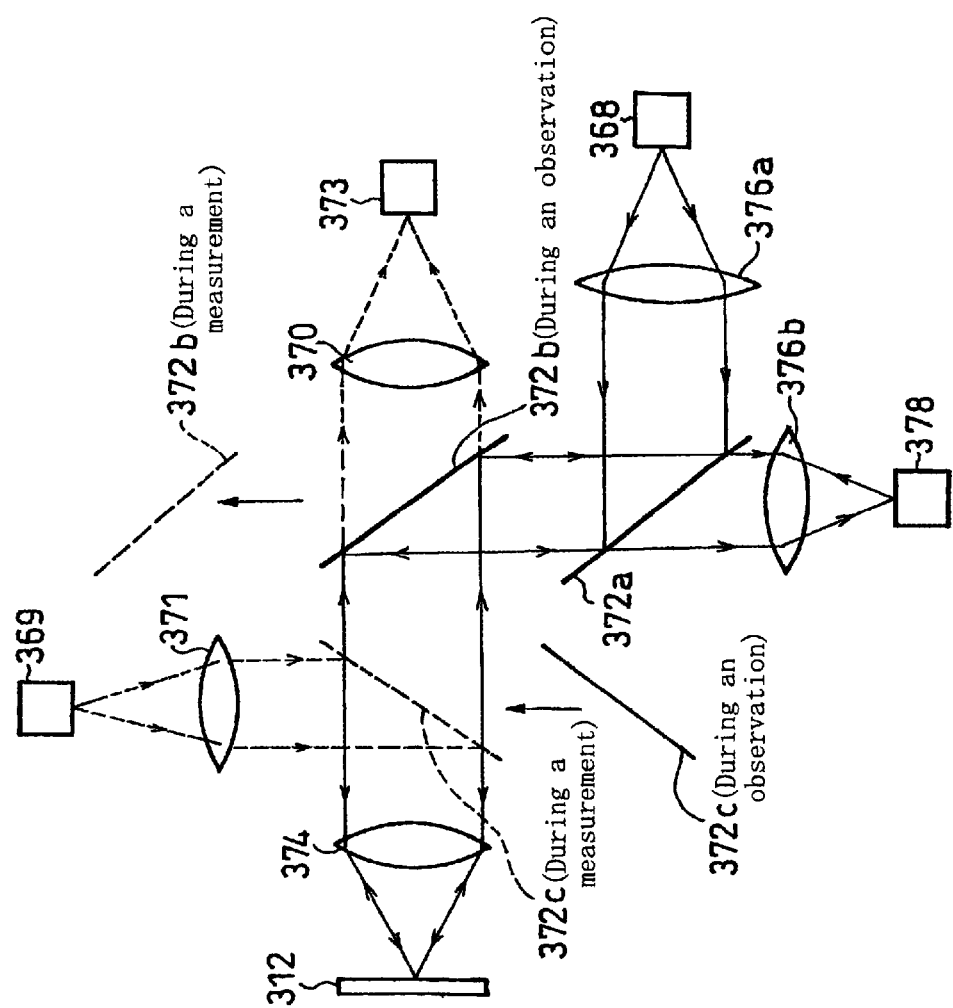
FIG. 14 is a view illustrating a state in which a sample is simply observed through the observing mechanism shown in FIG. 13 and measured.

Moreover, the structure of the observing mechanism 366 shown in FIG. 13 is partially changed and a mechanism shown in a solid line of FIG. 14 is used. Moreover, a sample 312 is provided in place of the end portion of the optical fiber and a beam splitter 372*b* is inserted in the optical path. Then, a white light emitted from the light source 368 is irradiated on the sample 312 through a lens 376*a*, beam splitters 372*a* and 372*b* and the lens 374. The sample image light is guided to the monitor 378 through the lens 374, the beam splitters 372*b* and 372*a* and the lens 376*b* so that it is possible to simply observe a region where a sample surface is provided.

Next, the beam splitter 372*b* shown in a broken line of FIG. 14 is retracted from the optical path. On the other hand, the beam splitter 372*c* is inserted in the optical path and a laser beam sent from the laser beam source 369 is irradiated on the sample 312 through the lens 371, the beam splitter 372*c* and the lens 374. When the light reflected from the sample 312 is introduced into a spectrometer 373 through the lens 374, the beam splitter 372*c* and the lens 370, it is possible to carry out microscopic spectrometry over the sample surface observed as described above.

<Simple Observing Mechanism 2>

In general, almost the whole surface to be measured in the sample is scanned and measured through the probe. In some cases, however, a certain region is to be observed simply. Also in these cases, the operation for scanning the whole surface to be measured is complicated.

Figure 15:
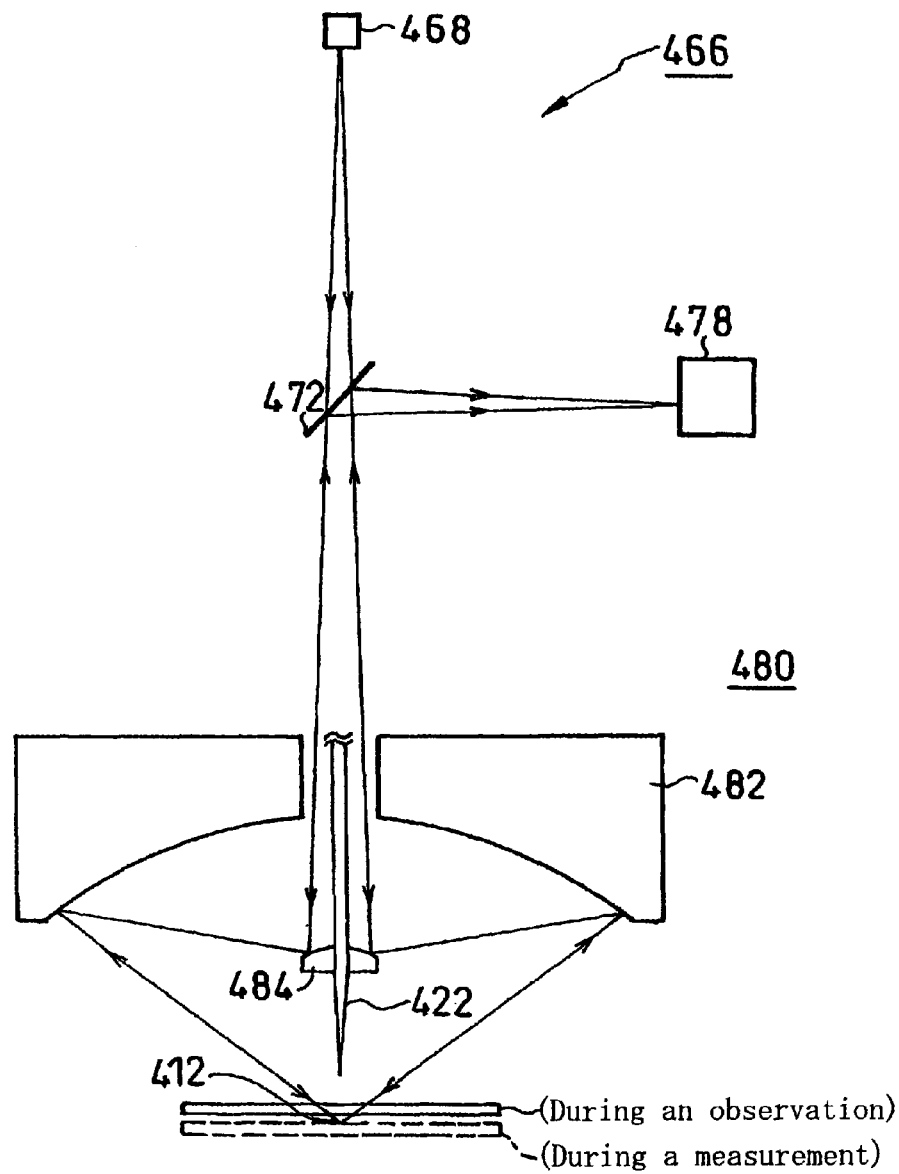
FIG. 15 is a view illustrating a variant of the observing mechanism shown in FIG. 14.

Therefore, it is preferable that a simple observing mechanism 466 shown in the enlarged view of FIG. 15 should be provided such that the certain region of a sample 412 can be observed simply.

In FIG. 15, the simple observing mechanism 466 comprises a Cassegrain mirror 480 and a probe 422 provided on the optical axes of a main mirror 482 formed of a concave mirror or the like and a sub mirror 484 formed of a truncated convex mirror or the like, for example.

A light emitted from a light source 468 is incident on the sub mirror 484 of the Cassegrain mirror 480 through a beam splitter 472 and the light reflected from the sub mirror 484 is incident in almost all directions of the sample 412 through the main mirror 482.

The light reflected from the sample 412 is collected into the main mirror 482 in almost all directions of the sample 412, is taken out upward from the optical axis through the sub mirror 484, and furthermore, is reflected rightwards in the drawing through the beam splitter 472 in the latter stage and can be thus observed through a monitor 478.

As a result, it is possible to observe the sample 412 from almost all the circumference through the Cassegrain mirror 480. Therefore, it is possible to easily observe the certain region of the sample 412 from almost just above substantially. Thus, it is also preferable that the sample 412 should be moved to a position shown in a broken line, thereby simply carrying out a measurement.

<Switching Display Mechanism for Optical Path or the like>

In general, a near-field optical microscope has measuring modes such as an illumination mode, a collection mode and the like, for example, in which an optical path or an optical element in an apparatus is often switched.

However, as the switching is carried out more variously, it can be grasped with more difficulty.

Figure 16:
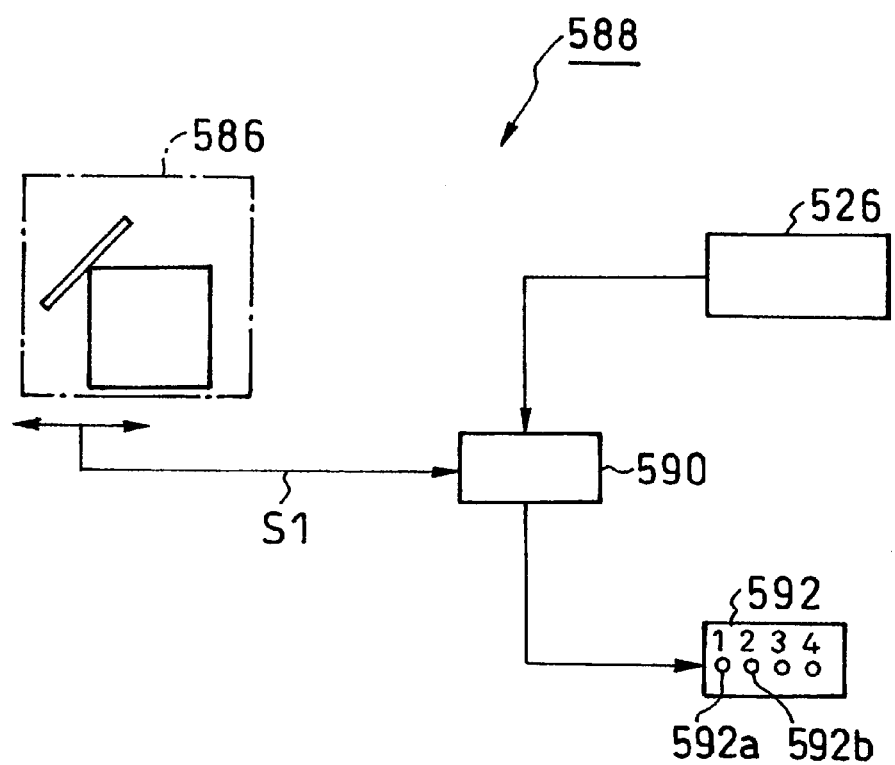
FIG. 16 is a view illustrating a mechanism for displaying an optical path or the like which is to be suitably used in the near-field optical microscope.

In a microscope in which an optical path or an optical element 586 is to be switched, it is preferable that a switching display mechanism 588 shown in the enlarged view of FIG. 16 should be provided.

The switching display mechanism 588 includes a PLD (a laser diode having an optical fiber) 590 and an LED 592 for switching display.

The PLD 590 directly detects a switching signal of an optical path switching mechanism and a switching mechanism for the optical element 586 or the like or an output S1 of a switching sensor, and turns on the LED 592 for switching display according to the contents of detection.

For example, when the optical element 586 or the like is switched such that the illumination mode can be set, only an LED 592a is turned on. When the optical eminent 586 or the like is switched such that the collection mode can be set, only an LED 592b is turned on. Consequently, it is possible to visually confirm the switching state of the optical path or the optical element.

As a result, it is possible to visually confirm the display of the optical path before and after a measurement and to carry out the measurement rapidly and accurately.

Moreover, the LED 592 is not turned on through software. Therefore, the LED 592 is not turned on due to a malfunction.

Moreover, it is also possible to visually guess and confirm the failures of hardware, for example, that the LED 592 is not turned on.

<Exhaust Mechanism of Gas Purge Type Probe Microscope>

In a gas purge type probe microscope, a sample chamber is put in a gas filling type cryostat. In general, the inside of the cryostat is always replaced with a gas.

However, there is no means for confirming a flow through a gas line, and there is a possibility that a gas might be wasted or a purge might be broken due to the shortage of the gas.

For this reason, a method of directly exhausting a laboratory is also proposed to easily confirm the gas flow.

However, there is a possibility that the concentration of oxygen in the laboratory might be reduced, resulting in an obstacle to an experiment.

Figure 17:
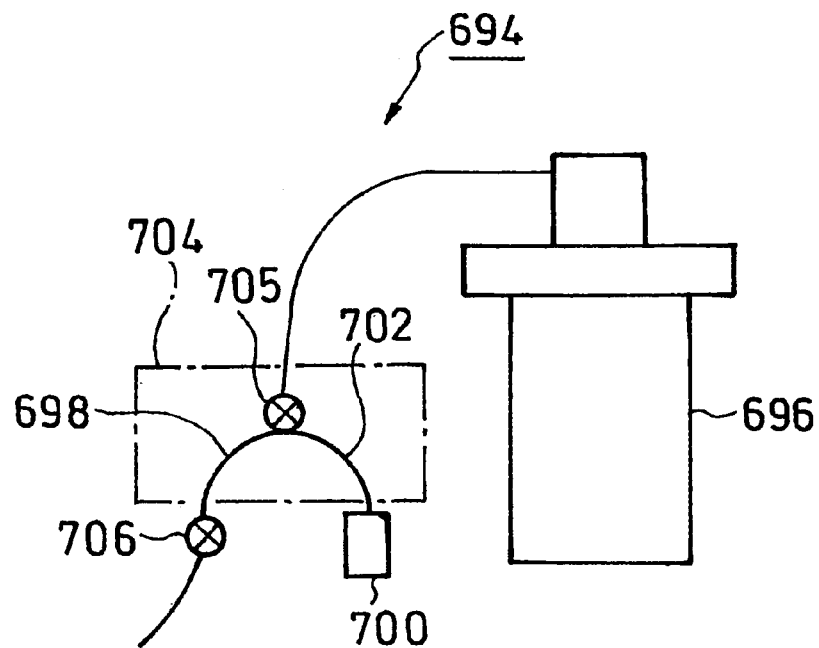
FIG. 17 is a view illustrating a gas discharge switching mechanism to be suitably used in the near-field optical microscope.

In the case in which the sample chamber of the near-field optical microscope is provided in a cryostat and a gas purge mechanism capable of carrying out gas purge is provided in the cryostat, it is preferable that an exhaust mechanism 694 shown in FIG. 17 should be provided in a cryostat 696.

In FIG. 17, the exhaust mechanism 694 is provided with a branch port 704 for a division into an exhaust system 698 for exhausting a gas supplied from the cryostat and a monitor system 702 for a flow meter or monitor 700 for monitoring the flow of the gas.

Moreover, a cock 705 is provided on the gas discharge side of a gas flow type cryostat, and detects a gas flow by means of the monitor 700 through the monitor system 702, while discharges the gas through the exhaust system 698.

As a result, after the discharge flow of the gas is confirmed by the monitor 700, the cock 705 carries out switching to the exhaust port 698. Consequently, it is possible to properly maintain a gas discharge flow, and there is no possibility that the concentration of oxygen in the laboratory might be reduced unnecessarily.

The cryostat 696 cools the sample chamber at a low temperature. After the measurement is completed, therefore, the gas reversely flows in the sample chamber and dew condensation is caused when a low temperature in the sample chamber is raised in some cases.

Therefore, it is preferable that the cock 706 should be provided to bring a closed state after the measurement is completed. Consequently, the reverse flow of the gas into the sample chamber can be prevented so that the dew condensation in the sample chamber can be prevented from being caused in the sample chamber.

<Infrared Near-field optical microscope>

In general, the near-field technique capable of implementing a space resolution exceeding a wavelength limitation is mainly realized by using a visible light laser. Since the wavelength of infrared rays is great, the application of an optical near-field has been expected.

However, conventionally, a measurement is only carried out using a single infrared wavelength laser and means for carrying out a spectrum measurement through an infrared optical near-field has not been proposed.

In order to acquire an infrared spectrum by using a laser, moreover, a wavelength variable laser should be developed and has not been completed for practical use.

Figure 18:
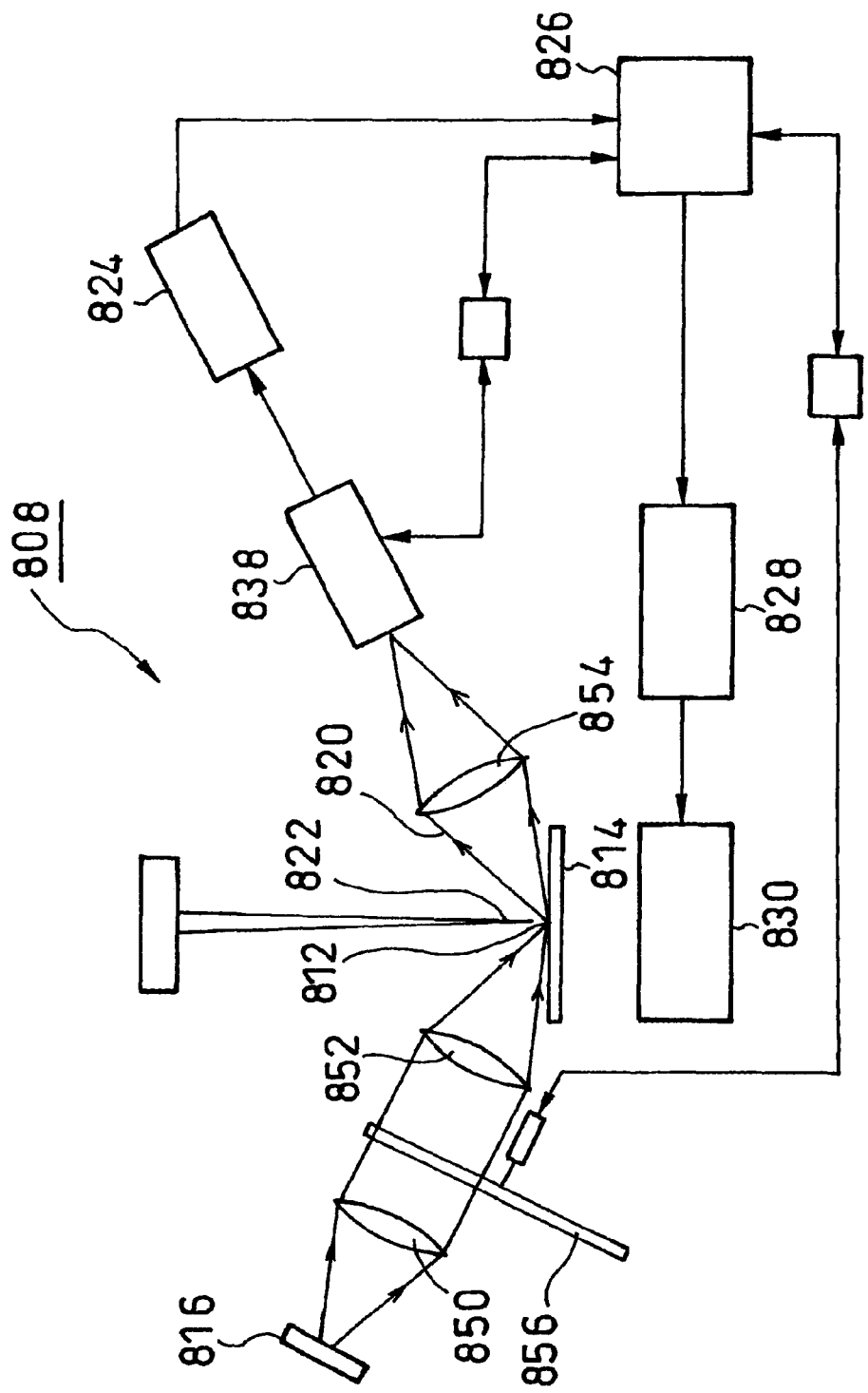
FIG. 18 is a view illustrating the schematic structure of an infrared near-field optical microscope to be suitably used in the near-field optical microscope.

Therefore, it is also preferable that an infrared near-field optical microscope 808 shown in FIG. 18 should be constituted. Portions corresponding to those in FIG. 3 have the reference numerals having 700 added thereto and description thereof will be omitted.

An infrared near-field optical microscope 808 shown in FIG. 18 is characterized by using a high temperature heating unit as a light source 816, by scattering the field of an evanescent light through a probe 822, and by using a spectrometer 838 for splitting a scattered light 820.

More specifically, infrared rays emitted from the high temperature heating unit are changed to a parallel light through a convex lens 850 which is incident on a convex lens 852 in the latter stage, is converged onto the lens 852 and is then irradiated at such an angle as to be entirely reflected from a surface 812 to be measured.

The evanescent light is generated on the surface to be measured through such infrared irradiation, and the field of the light is scattered through the metallic probe 822 and the scattered light 820 is collected through a convex lens 854 in the latter stage and is then incident on the spectrometer 838. In the spectrometer 838, the light is split for each wavelength and is detected through an infrared detector 824, and a spectrum can be obtained through a computer 826.

As a result, it is possible to measure a near-field infrared spectrum without using a laser.

For the high temperature heating unit, it is possible to use a carbon silicon rod, a Nernst heating unit, a carbon arc, a carbon rod, graphite, a fire rod, a nichrome wire, a kanthal wire, a platinum wire, ceramics and the like.

For wavelength selecting means, moreover, it is possible to use a wavelength variable filter, a band pass filter having an optional wavelength width, a Fourier transformation type spectrometer, a distribution type spectrometer and the like.

Furthermore, a light signal projected onto an infrared detector can also be intermittently modulated through a chopper 856 provided in the middle of the light source and the sample.

With the above-mentioned structure, the total reflection illumination mode is set. It is also preferable that a reflection illumination mode should be set and both modes should be switched through the switching of an optical system in order to simplify the structure.

For the total reflection illumination mode, it is also preferable that an illuminating system for focusing an image of a Cassegrain mirror around a plan portion of a high refractive index medium prism having a semispherical or almost semispherical shape.

For the high refractive index medium, ZnSe, KRS-5, Ge, Si, diamond or the like is used.

In the reflection illumination system, moreover, it is also preferable that the sample should be illuminated by using the Cassegrain mirror because the sample can be illuminated in many directions.

Furthermore, it is preferable that an optical system such as a switching reflection mirror or a dichroic mirror should be provided in the middle of the Cassegrain mirror and the infrared detector to observe the sample and the probe in order to simplify the structure.

<Off-Axis Cassegrain Mirror>

In general, a Cassegrain mirror wholly constituted by a mirror has often been used in an infrared range, particularly, because a structure such as a glass has no transmission and absorption and NA can be comparatively increased as compared with a lens.

However, a light in a central portion having the highest optical utility value is rarely utilized in respect of the arrangement of the mirror. For the same reason, moreover, only a circular portion in all scattering angles is utilized and an actual NA is not sufficiently great.

Figure 19:
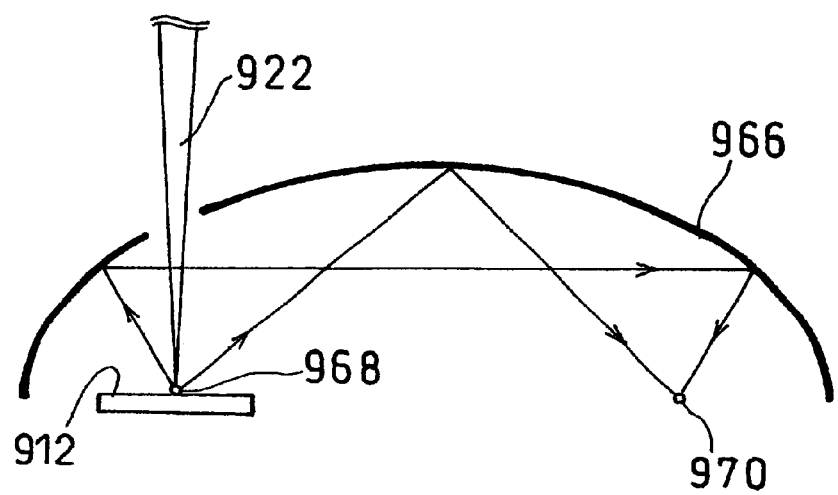
FIG. 19 is a view illustrating a light collecting mechanism to be suitably used in the infrared near-field optical microscope or the like, FIG. 20 is a view illustrating a mechanism for automatically setting a resonance frequency which is to be suitably used in the near-field optical microscope.

As shown in the enlarged view of FIG. 19, it is preferable that an elliptical mirror 966 should be used as a concave mirror constituting the Cassegrain mirror to convert a light generated from a focal point 968 into a parallel light through a convex mirror provided in a focal point 970 which is to be taken out.

It is preferable that the Cassegrain mirror should be used for any of the image observation of a probe microscope, scattered light collection and light irradiation. Alternatively, it is also preferable that the Cassegrain mirror using the elliptical mirror 966 should be utilized for any of the image observation, the light collection and the irradiation for infrared, visible, ultraviolet microspectroscopy.

As shown in FIG. 19, for example, it is preferable that the sample 912 should be put on the focal point 968 and detecting means such as a spectrometer or a detector should be provided on the focal point 970. Consequently, the optical signal from the sample 912 can be guided to the detecting means without using another optical system. Therefore, the structure can be simplified as compared with the case in which the Cassegrain mirror using the elliptical mirror 966 is not used.

As a result, the light can be collected in almost all directions through the Cassegrain mirror using the elliptical mirror 966. Consequently, all scattered lights over the whole upper semisphere can be utilized. Moreover, an excessive stray light transmitted from the outside can also be cut.

<Mechanism for Automatically Setting Resonance Frequency>

In the measurement of a probe microscope, the resonance of a probe has often been utilized. The resonance of the probe is slightly varied for each probe. In order to carry out an optimum measurement, it is necessary to strictly adjust the resonance frequency of the probe after exchanging the probe.

For this reason, setting is manually carried out while watching a resonance signal or measuring the whole resonance frequency spectrum to detect a peak thereof.

In this case, however, a time and labor is required.

In a probe microscope utilizing the resonance of the probe for the measurement, it is preferable that a resonance frequency should be automatically set to the resonance frequency thus detected.

Figure 20:
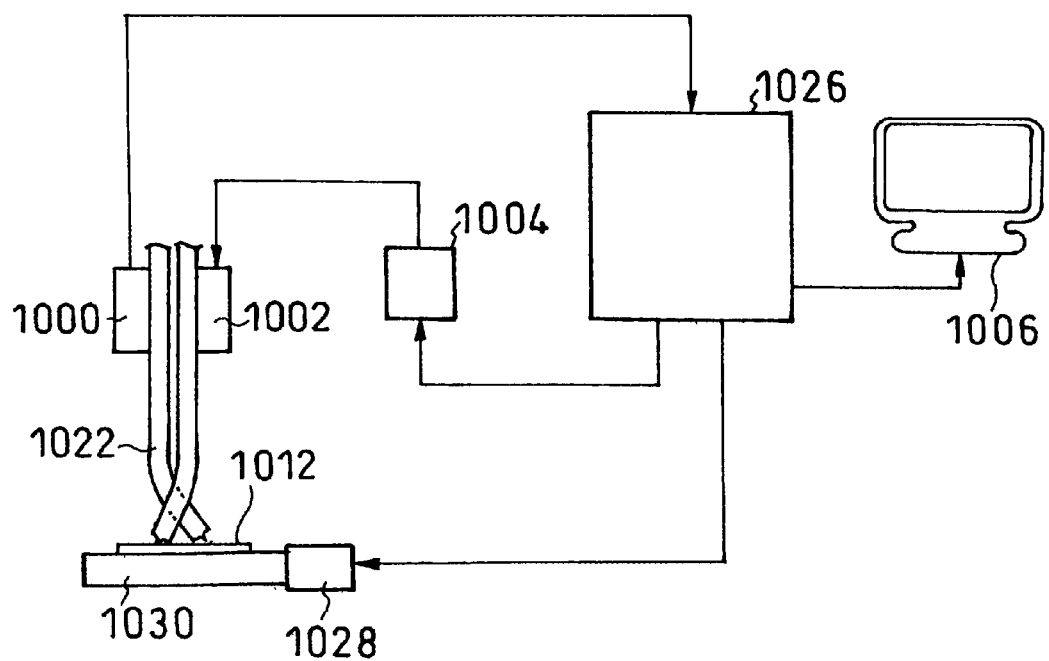

As shown in FIG. 20, therefore, there are provided detecting means 1000, a computer 1026 and exciting means 1002.

The detecting means 1000 detects the resonance frequency of a probe 1022.

The computer 1026 sets the excitation frequency of the exciting means 1002 to the resonance frequency of the probe 1022 which is detected by the detecting means 1000.

The exciting means 1002 oscillates the probe 1022 with a resonance frequency set by the computer 1026.

By using a mechanism for automatically setting the resonance frequency of the detecting means 1000, the computer 1026 or the like, consequently, the resonance frequency of the probe can be detected and set automatically. Therefore, it is very easy to carry out a work for adjusting the resonance frequency of the probe after exchanging the probe.

The computer 1026 moves a stage 1030 through a stage controller 1028 and a distance in a vertical direction between the tip portion of the probe 1022 and a sample 1012 is controlled such that the oscillation amplitude of the probe 1022 which is detected by the detecting means 1000 is constant, and a surface to be measured in the sample 1012 is thus scanned. Consequently, it is possible to accurately grasp the concavo-convex portions of the sample 1012 in a non-contact with the sample 1012.

In the case in which the resonance frequency is to be detected and set automatically, preferably, a white noise signal is input to the exciting means, the oscillation amplitude signal of the probe is Fourier transformed, the peak position of a resonance frequency spectrum thus obtained is detected, and the excitation frequency of the exciting means is set to a resonance frequency in the peak position thus detected.

In FIG. 20, therefore, signal generating means 1004 is provided between the computer 1026 and the exciting means 1002.

The signal generating means 1004 generates a white noise signal to be input to the exciting means 1002.

The exciting means 1002 oscillates the probe 1022 in accordance with the input white noise.

The detecting means 1000 detects the oscillation amplitude signal of the probe 1022.

The computer 1026 Fourier transforms the oscillation amplitude signal of the probe 1022 which is obtained by the detecting means 1000, and detects the peak position of the resonance frequency spectrum thus obtained. Then, the excitation frequency of the exciting means 1002 is set to a resonance frequency in the peak position thus detected.

As a result, it is possible to detect and set the resonance frequency of the probe rapidly and accurately.

In the case in which the peak position of the resonance frequency spectrum is to be detected, it is also preferable that a frequency should be swept to detect the peak of the resonance frequency spectrum and an excitation frequency should be set to the resonance frequency of the peak thus detected.

In FIG. 20, therefore, the computer 1026 sweeps the frequency of the resonance frequency spectrum obtained by Fourier transforming the oscillation amplitude signal sent from the detecting means 1000, thereby detecting a peak position. The excitation frequency of the exciting means 1002 is set to a resonance frequency in the peak position thus detected.

As a result, it is possible to detect and set the resonance frequency of the probe rapidly and accurately.

In the case in which the frequency of the resonance frequency spectrum is to be swept, a range in which the frequency is to be swept is designated to roughly sweep the frequency. Thus, an approximate peak position is specified. Then, it is also preferable that only the vicinity of the peak position should be finely swept again to specify the peak position and an excitation frequency should be set to a frequency in the peak position.

In FIG. 20, therefore, the computer 1026 first displays, on a display 1006, the resonance frequency spectrum obtained by Fourier transforming the oscillation amplitude signal sent from the detecting means 1000.

A user sets the range in which the frequency is to be swept to the computer 1026 while seeing the spectrum on the display 1006.

Then, the computer 1026 roughly sweeps the frequency in the set range, thereby specifying an approximate peak position. Thereafter, the computer 1026 finely sweeps only the vicinity of the peak position again, thereby specifying the peak position and setting an excitation frequency to a frequency in the peak position.

As a result, it is possible to detect and set the resonance frequency of the probe rapidly and accurately.

<Mechanism for Controlling Distance Between Probe and Sample>

In an AFM, an STM, a near-field optical microscope or the like, there have been proposed various techniques for controlling a distance between a probe and a sample.

In a near-field optical microscope for obtaining information about a sample from a light signal collected through the fine opening of a probe or the like, for example, there have been known a method of exciting a probe to detect an oscillation amplitude, a method of detecting a signal intensity collected in the fine opening of a probe, and the like.

In the method of exciting a probe to detect an oscillation amplitude, however, it is necessary to prepare a laser for control. In some cases, moreover, a laser beam from the laser is mixed in light emission from the sample.

In the method of detecting a signal intensity collected through the fine opening of a probe, furthermore, the light signal from the fine opening including the information about the sample is decreased. Moreover, a physical interaction with the sample is utilized. Therefore, there is a drawback that a soft and weak sample cannot be applied.

In a probe microscope for scanning the surface of a sample to measure the shape of the surface while maintaining the distance between the sharpened probe and the surface of the sample to be constant, it is preferable that an evanescent light generated on the sample stage through a light incident on a transparent sample stage under total reflection conditions should be collected from the outside through a lens or the like, and the intensity of the light scattered by the probe should be detected and control should be carried out by using the signal as information about a distance.

Figure 21:
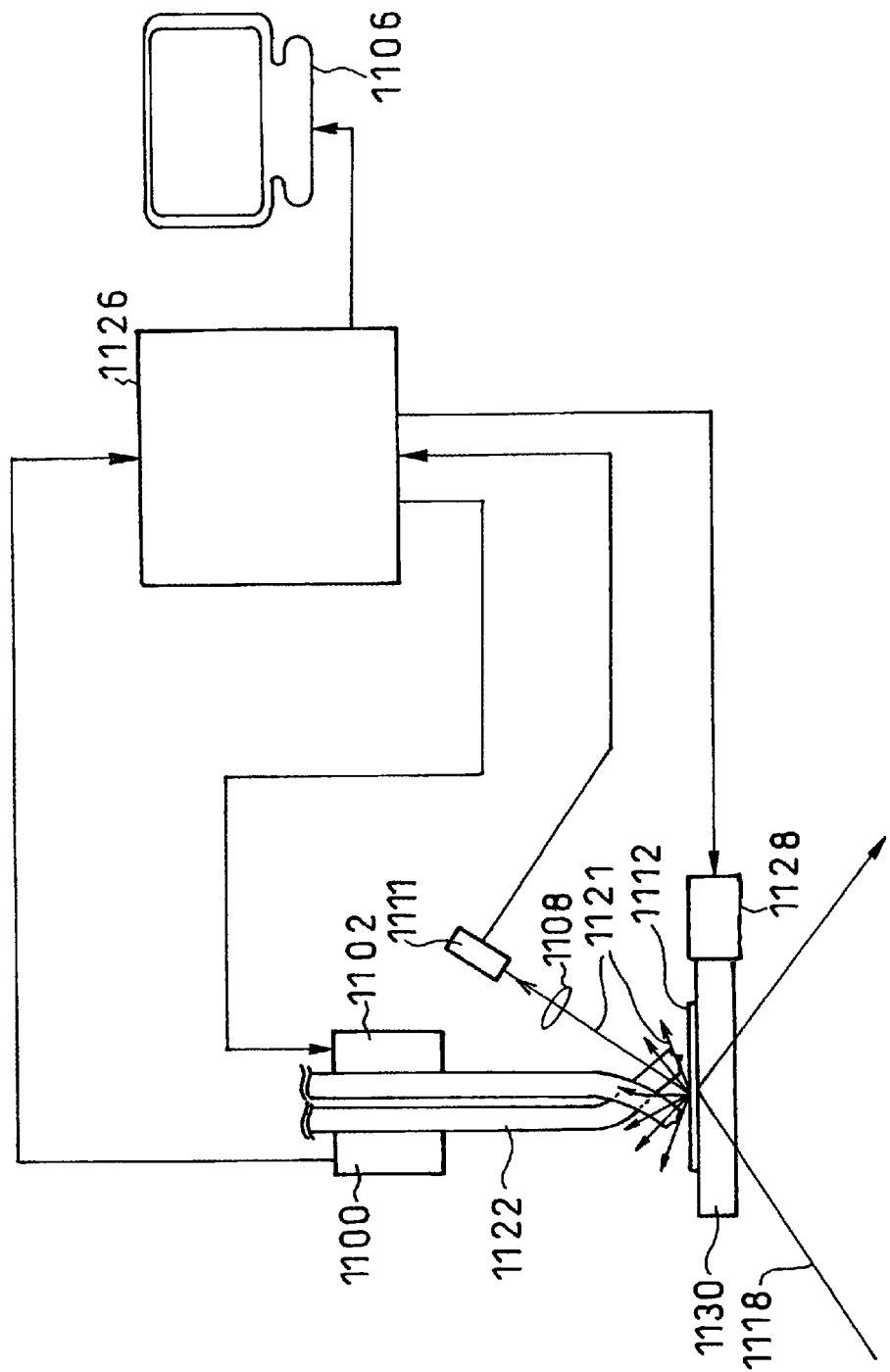
FIG. 21 is a view illustrating a mechanism for controlling a distance between a probe and a sample which is to be suitably used in the near-field optical microscope.

As shown in FIG. 21, therefore, a transparent sample stage is used for a sample stage 1130 to cause an excited light 1118 to be incident from the back side onto a sample 1112 on the stage 1130 such that total reflection conditions are satisfied.

Then, the field of the evanescent light generated on the sample 1112 from the excited light 1118 is scattered by a probe 1122, the intensity of a scattered light 1121 is collected from the outside through light collecting means 1108 such as a lens, spectral analysis is carried out by a spectral analyzing portion 1111, and the signal intensity is input to a computer 1126.

The computer 1126 moves a stage 1130 through a stage controller 1028 and a distance in a vertical direction between the tip portion of the probe 1122 and a sample 1112 is controlled such that the signal intensity detected by the detecting means 1100 is constant, and a surface to be measured in the sample 1112 is thus scanned. Consequently, it is possible to accurately grasp the concavo-convex portions of the sample 1112 in a non-contact with the sample 1112.

By the mechanism for controlling the distance between the probe and the sample described above, consequently, the field of the evanescent light generated on the sample 1112 from the excited light 1118 incident on the opposite side to the detection side under total reflection conditions is scattered through the probe 1122, and the intensity of the scattered light 1121 is collected from the outside by the collecting means 1108 such as a lens and is used for controlling the distance between the probe 1122 and the sample 1112 in the latter stage. Therefore, since an excessive excited light is not introduced into a detecting system, it is possible to accurately control the distance between the probe and the sample for a soft and weak sample without damaging information about a light from the sample 1112.

<Mechanism for Monitoring Near-field Mapping Spectrum Analysis>

In a near-field optical spectrometer, a background spectrum of a measuring system is superposed on a signal from a sample to obstruct the observation of the spectrum of the sample.

In the case in which the spectrum of the sample is very weak for the background, it is hard to ascertain whether or not an intended peak is obtained during a mapping measurement. In some cases, there is used a method of subtracting a measuring spectrum by using the background spectrum acquired before starting the measurement or after completing the measurement.

In the optical near-field spectral measurement in which a time required for the measurement is long, however, it is impossible to obtain a sufficient effect due to a drift of the apparatus or the like.

Therefore, it is preferable that the near-field optical spectrometer should comprise a mechanism having means for measuring the background spectrum of an optical near-field in a state in which the distance between the probe and the sample is sufficiently great and serving to display, a real time, a spectrum obtained by subtracting the measured background spectrum during a mapping spectrum measurement in a state in which the probe and the sample are in an optical near-field region.

Figure 22:
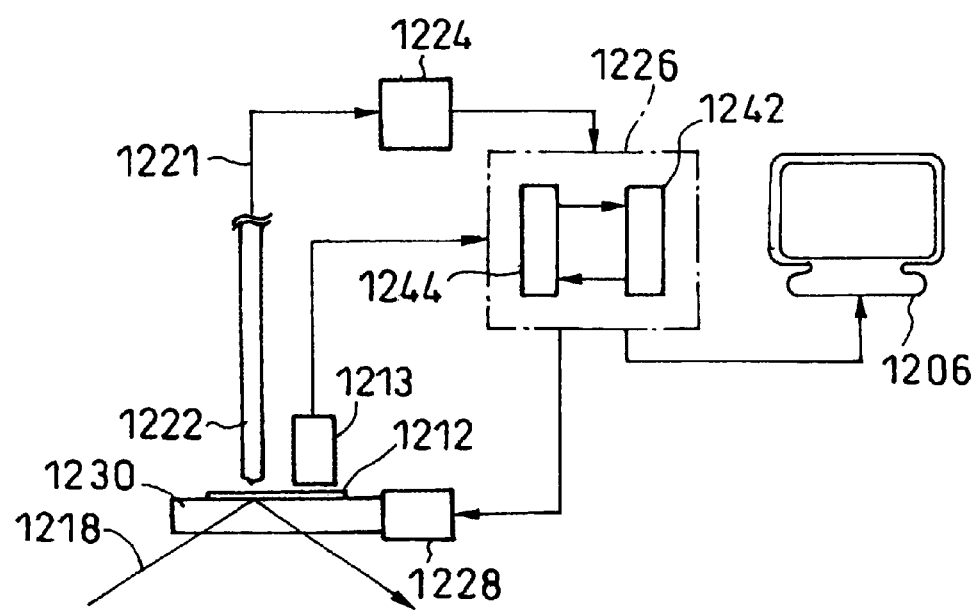
FIG. 22 is a view illustrating a mechanism for monitoring a near-field mapping spectrum analysis which is to be suitably used in the near-field optical microscope.

As shown in FIG. 22, therefore, background measuring means 1213, a computer 1226 and a display 1206 are provided.

First of all, the computer 1226 moves a stage 1230 through a stage controller 1228 such that a distance between a probe 1222 and a sample 1212 is sufficiently great.

In this state, the background measuring means 1213 serves to measure the background of an optical near-field on the sample 1212.

The computer 1226 obtains a background spectrum based on a result obtained by the background measuring means 1213 through a CPU 1244 and stores the background spectrum in an HDD 1242.

The CPU 1244 obtains a spectrum by subtracting the background spectrum stored in the HDD 1242 from the optical near-field mapping spectrum measured through a spectral analyzing portion 1224 during a measurement, and displays the same spectrum on the display 1206.

As a result, it is possible to reliably observe the peak of a sample during the measurement by using a mechanism for monitoring an optical near-field mapping spectrum analysis described above.

Moreover, it is possible to obtain an optical near-field mapping spectrum which is affected by the drift of the apparatus with difficulty.

It is also preferable that a mechanism for taking a background spectrum in an optional measurement part of the sample during the measurement and optionally updating a background to be a reference.

In FIG. 22, the background measuring means 1213 serves to measure the background of the near-field on the sample 1212 during a normal measurement.

The computer 1226 takes a background spectrum based on a result obtained by the background measuring means 1213 through the CPU 1244 and updates the background spectrum stored in the HDD 1242.

It is also preferable that the background spectrum should be taken after one line on a surface to be measured in the sample is measured completely and should be employed for a background spectrum after a next line is measured completely.

In FIG. 22, therefore, the computer 1226 obtains information about concavo-convex portions of the sample 1212 in a non-contact with one line on the sample 1212 by driving the stage controller 1228.

Next, the computer 1226 causes the background measuring means 1213 to measure the background of the near-field on the sample 1212 as described above.

After the measurement, the computer 1226 takes a background spectrum based on a result obtained by the background measuring means 1213 through the CPU 1244 and updates the background spectrum stored in the HDD 1242.

Subsequently, the computer 1226 obtains information about concavo-convex portions of the sample 1112 in a non-contact with a next line on the sample 1112 by driving the stage controller 1228.

The CPU 1244 obtains a spectrum by subtracting the background spectrum stored in the HDD 1242 from the near-field mapping spectrum measured by the spectral analyzing portion 1224 during the measurement, and displays the spectrum on the display 1206.

During the measurement, thus, the following operations are repeated until a desirable area on the sample is measured completely:

(1) taking and updating the background spectrum;
(2) taking the near-field mapping spectrum for one line on the sample 1112;
(3) correcting the near-field mapping spectrum for one line based on the background spectrum updated in the (1) immediately therebefore;
(4) taking and updating the background spectrum;
(5) taking the near-field mapping spectrum for a next line on the sample 1112; and
(6) correcting the near-field mapping spectrum for the line based on the background spectrum updated in the (4) immediately therebefore.

As a result, it is possible to reliably observe the peak of the sample during a measurement by using the mechanism for monitoring a near-field mapping spectrum analysis described above. It is possible to take a mapping spectrum which is affected by the drift of the apparatus with difficulty.

<Mechanism for Measuring Electric Field Application Near-field using Flat Probe>

In a probe microscope such as an atomic force microscope and a scanning tunneling microscope, there has been known a method of applying a constant voltage between a probe and a sample or a sample stage to check the behavior of the sample.

In these methods, the probe serves as one of electrodes and should be sharpened in order to maintain a necessary special resolution.

For this reason, the function of an electrode to be a flat surface is restricted and the distribution of an electric field applied to the sample is not satisfactory.

Although the probe microscope can measure the shape of a surface of a sample, information required for the sample having a trouble of optical characteristics cannot be taken.

Moreover, there has not been a method of observing, through a microscope, a sample portion with the arrangement of an electrode on the sample side.

In the optical near-field measurement using a probe obtained by flattening a metal coating film in the tip portion thereof, it is preferable that an electric field should be applied between the probe and the sample itself or sample stage to measure a change in the sample corresponding to the given electric field in a high special resolution.

Figure 23:
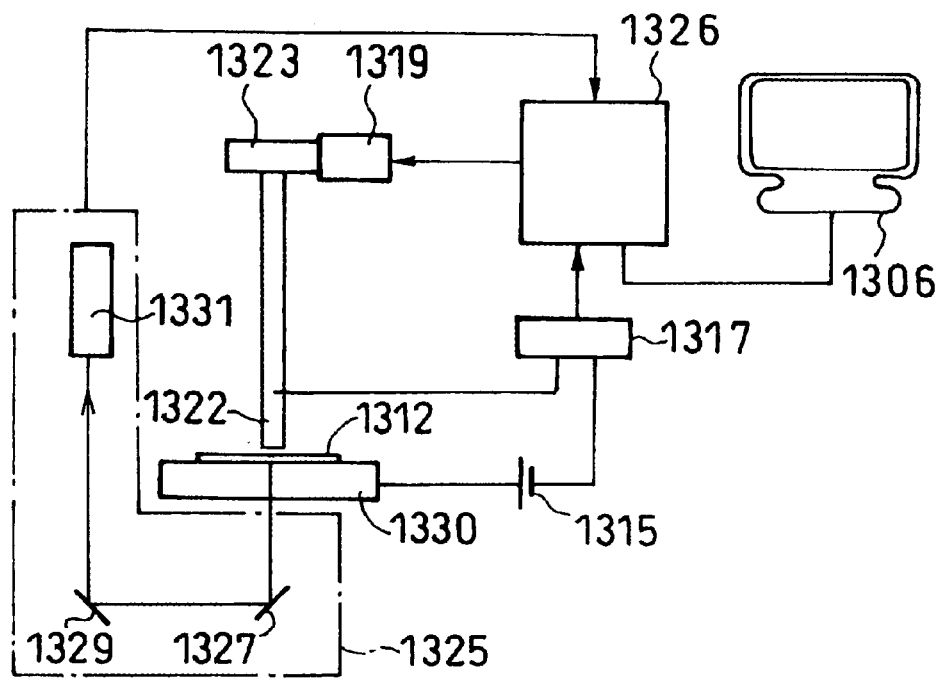
FIG. 23 is a view illustrating a mechanism for measuring a near-field where electric field is applied using a flat probe which is to be suitably used in the near-field optical microscope.

As shown in FIG. 23, therefore, the metal coating film in the tip portion of a probe 1322 is flattened. Moreover, electric field applying means 1315 is provided.

The electric field applying means 1315 applies a desirable constant electric field between the probe 1322 and a sample stage 1330, and a change in the electric field according to a variation in the distance between the probe 1322 and the sample stage 1330 is input to a computer 1326 through an amplifier 1317.

Then, when the computer 1326 drives an actuator 1323 through a controller 1319 and scans a surface to be measured in a sample 1312 while controlling a vertical distance between the tip portion of the probe 1322 and the sample 1312 so as to make electric field signal from the amplifier 1317 constant, it is possible to accurately grasp the concavo-convex portions of the sample 1312 in a non-contact with the sample 1312.

As a result, an almost flat counter electrode can be formed by using an optical near-field applied electric field measuring mechanism using the flat probe described above. Therefore, it is possible to apply an almost uniform electric field to the sample.

Accordingly, an almost uniform electric field can be applied to the sample. Therefore, it is possible to accurately carry out a measurement of the operation of a liquid crystal, a measurement of the behavior of a solute in the water, a measurement of the behavior of a sample fixed to a substrate in the water, and the like.

Preferably, a sample can be observed through a microscope on the opposite side to the probe by using a transparent electrode as a sample stage acting as an electrode.

In FIG. 23, therefore, a transparent electrode is used as the sample stage 1330. Moreover, observing means 1325 is provided.

The observing means 1325 includes reflection mirrors 1327 and 1329 and a CCD camera 1331.

The state of the sample 1312 is photographed by the CCD camera 1331 by guiding a light through the transparent sample stage 1330 by means of the reflection mirrors 1327 and 1329.

A video signal obtained by the CCD camera 1331 is input to the computer 1326 and is displayed on a display 1306.

Therefore, since a user can observe the sample 1312 on the display 1306, the shape of a surface is measured and a measurement is carried out on a sample having a trouble of optical characteristics. Thus, necessary information can be taken.

As described above, according to the probe opening forming apparatus according to the present invention and the near-field optical microscope using the probe opening forming apparatus, pressing control means for controlling the press of a tip portion of a probe with light detecting means in a direction of an optical axis through pressing means such that a value of a light quantity detected by the light detecting means for detecting a quantity of a light transmitted from the tip portion of the probe is equal to a value of a light quantity for obtaining an opening having a desirable size. Therefore, it is possible to easily form an opening having a desirable size in the tip portion of the probe.

According to the near-field optical microscope in accordance with the present invention, moreover, an opening diameter checking mechanism for checking the size of the opening in the probe having the opening formed thereon is provided. Consequently, the size of the opening of the probe can be checked easily.

According to the near-field optical microscope in accordance with the present invention, furthermore, an opening diameter regulating mechanism for changing the size of the opening in the probe having the opening formed thereon is provided. Consequently, the size of the opening of the probe can be changed easily.

Numerous modifications and alternative embodiments of the present invention will be apparent to those skilled in the art in view of the foregoing description. Accordingly, this description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

We claim:

1. A probe opening forming apparatus for opening a mask of a tip portion of a probe with a desirable size, comprising a core constituted by a material having a light transmittance and a mask formed on the core and constituted by a material having a ductility and a light shielding property, comprising:

a light source for causing a light to be incident in the probe;

light detecting means which is on contact with the tip portion of the probe for detecting a quantity of a light transmitted from the tip portion of the probe;

pressing means f or pressing the tip portion of the probe against the light detecting means in a direction of an optical axis;

storage means for previously storing information about relation of the quantity of the light transmitted from the tip portion of the probe and the size of the opening;

calculating means for obtaining the value of the light quantity for obtaining an opening having a desirable size based on the information about the relation of the quantity of the light transmitted from the tip portion of the probe and the size of the opening which is stored in the storage means; and pressing control means for controlling the press of the tip portion of the probe against the light detecting means in the direction of the optical axis through the pressing means such that a value of a light quantity detected by the light detecting means is equal to the value of the light quantity calculated from the calculating means.

2. The probe opening forming apparatus according to claim 1, wherein a feeding means for pressing the tip portion of the probe against the light detecting means in the direction of the optical axis is used for the pressing means such that the mask of the tip portion of the probe is gradually stretched thinly and is thus opened without a breakage.

3. The probe opening forming apparatus according to claim 1, wherein a photodiode for receiving a light transmitted from the tip portion of the probe through a light receiving portion and for outputting a current value proportional to the quantity of the received light is used for the light detecting means.

4. A near-field optical microscope comprising the probe opening forming apparatus according to claim 1, wherein a field of an evanescent light on a surface to be measured in a sample is scattered through the tip portion of the probe having an opening formed thereon by the opening forming apparatus, the scattered light is collected through the opening or evanescent light leaking out of the opening is irradiated on the surface to be measured, and the scattered light or a reflected light is collected through the opening, thereby obtaining information about the surface to be measured in the sample.

5. The near-field optical microscope according to claim 4, wherein a feeding means for controlling a distance between the tip portion of the probe and the surface to be measured in the sample in a direction of an optical axis is used for the pressing means.

6. The near-field optical microscope according to claim 4, comprising an opening diameter checking mechanism for checking a size of an opening in a tip portion of a probe having the opening formed thereon, the opening diameter checking mechanism comprising:

the light source for causing a light to be incident in the probe;

the light detecting means which is on contact with the tip portion of the probe for detecting a quantity of a light transmitted from the tip portion of the probe;

the pressing means for pressing the tip portion of the probe against the light detecting means in a direction of an optical axis;

the storage means for previously storing information about relation of the quantity of the light transmitted from the tip portion of the probe and the size of the opening; and a comparing means for applying a value of a light quantity detected by the light detecting means to the information about the relation of the quantity of the light transmitted from the tip portion of the probe and the size of the opening which is stored in the storage means, thereby obtaining the size of the opening in the tip portion of the probe.

7. The near-field optical microscope according to claim 5, comprising an opening diameter regulating mechanism for changing a size of an opening in a tip portion of a probe having the opening formed thereon, the opening diameter regulating mechanism comprising:

the light source for causing a light to be incident in the probe;

the light detecting means which is on contact with the tip portion of the probe for detecting a quantity of a light transmitted from the tip portion of the probe;

the pressing means for pressing the tip portion of the probe against the light detecting means in a direction of an optical axis;

the storage means for previously storing information about relation of the quantity of the light transmitted from the tip portion of the probe and the size of the opening;

setting means for setting a desirable size of the opening in the tip portion of the probe;

calculating means for obtaining the value of the light quantity for obtaining an opening having a size set by the setting means based on the information about the relation of the quantity of the light transmitted from the tip portion of the probe and the size of the opening which is stored in the storage means; and the pressing control means for controlling the press of the tip portion of the probe against the light detecting means in the direction of the optical axis through the pressing means such that a value of a light quantity detected by the light detecting means is equal to the value of the light quantity calculated from the calculating means.

8. The probe opening forming apparatus according to claim 1, wherein the probe is used for near-field optical measurement.

9. The probe opening forming apparatus according to claim 1, comprising an input device for setting the desirable size of the opening in the tip portion of the probe, wherein the calculating means applies the opening diameter set by the input device to the information about the relation of the quantity of the light transmitted from the tip portion of the probe and the size of the opening which is stored in the storage means, thereby calculating the value of the light transmitted from the tip portion of the probe in order to obtain the desirable opening diameter set by the input device.

10. The near-field optical microscope according to claim 5, wherein the feeding means comprises a stage for controlling the distance between the tip portion of the probe and the sample, wherein the light detecting means is provided with substrate of the stage such that the light receiving surface of the light detecting means is on the level with the surface of the substrate of the stage.

11. The near-field optical microscope according to claim 6, comprising a stage for controlling the distance between the tip portion of the probe and the sample, wherein the light detecting means is provided with substrate of the stage such that the light receiving surface of the light detecting means is on the level with the surface of the substrate of the stage.

12. The near-field optical microscope according to claim 7, comprising a stage for controlling the distance between the tip portion of the probe and the sample, wherein the light detecting means is provided with substrate of the stage such that the light receiving surface of the light detecting means is on the level with the surface of the substrate of the stage.

* * * * *